(12) United States Patent
Zhang et al.

(10) Patent No.: US 11,875,117 B2
(45) Date of Patent: Jan. 16, 2024

(54) ONTOLOGY MANAGEMENT METHOD AND M2M PLATFORM

(71) Applicant: HUAWEI CLOUD COMPUTING TECHNOLOGIES CO., LTD., Guizhou (CN)

(72) Inventors: Feng Zhang, Xi'an (CN); Yongjing Zhang, Nanjing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 75 days.

(21) Appl. No.: 16/728,859

(22) Filed: Dec. 27, 2019

(65) Prior Publication Data

US 2020/0134265 A1 Apr. 30, 2020

Related U.S. Application Data

(63) Continuation of application No. PCT/CN2018/093000, filed on Jun. 27, 2018.

(30) Foreign Application Priority Data

Jun. 30, 2017 (CN) .......................... 201710526858.5
Aug. 9, 2017 (CN) .......................... 201710677547.9

(51) Int. Cl.
*G06F 40/30* (2020.01)
*G06F 16/242* (2019.01)
(Continued)

(52) U.S. Cl.
CPC ............ *G06F 40/30* (2020.01); *G06F 16/243* (2019.01); *G06F 16/248* (2019.01);
(Continued)

(58) Field of Classification Search
CPC ........ G06F 40/30; G06F 40/137; G06F 40/14; G06F 16/367; G06F 16/243; G06F 16/248; G06F 40/295
See application file for complete search history.

(56) References Cited

U.S. PATENT DOCUMENTS 11,080,336 B2 * 8/2021 Van Dusen ............ G06Q 50/01
2003/0088543 A1 * 5/2003 Skeen ...................... G06F 40/12
(Continued)

FOREIGN PATENT DOCUMENTS

| CN | 106663101 A | 5/2017 |
| CN | 106663143 A | 5/2017 |

(Continued)

OTHER PUBLICATIONS

Shvaiko, P., "Ontology Matching: State of the Art and Future Challenges," IEEE Transactions on Knowledge and Data Engineering vol. 25, Issue: 1, Jan. 2013, pp. 158-176.

(Continued)

*Primary Examiner* — Keith D Bloomquist
(74) *Attorney, Agent, or Firm* — Conley Rose, P.C.

(57) ABSTRACT

An ontology management method includes receiving, by a machine-to-machine (M2M) platform, an ontology mapping request sent by a first application entity, where the ontology mapping request carries a first ontology identifier, a second ontology identifier, and mapping method description information, determining, by the M2M platform, a first ontology and a second ontology based on the first ontology identifier and the second ontology identifier, determining, by the M2M platform, a mapping manner based on the mapping method description information, and creating mapping between the first ontology and the second ontology according to the determined mapping manner, and storing, by the M2M platform, the mapping between the first ontology and the second ontology in an ontology mapping resource, and (Continued)

returning an identifier of the ontology mapping resource to the first application entity.

20 Claims, 15 Drawing Sheets

(51) Int. Cl.
*G06F 16/248* (2019.01)
*G06F 40/295* (2020.01)
*G06F 16/36* (2019.01)
*G06F 40/137* (2020.01)
*G06F 40/14* (2020.01)

(52) U.S. Cl.
CPC .......... *G06F 16/367* (2019.01); *G06F 40/137* (2020.01); *G06F 40/14* (2020.01); *G06F 40/295* (2020.01)

(56) References Cited

U.S. PATENT DOCUMENTS

| | | | | |
|---|---|---|---|---|
| 2007/0083607 | A1* | 4/2007 | Thompson | G06F 16/258 709/217 |
| 2007/0226246 | A1* | 9/2007 | Dheap | G06F 16/86 |
| 2008/0027981 | A1* | 1/2008 | Wahl | G06F 16/258 |
| 2016/0019294 | A1 | 1/2016 | Dong et al. | |
| 2016/0203234 | A1* | 7/2016 | Piccand | H04W 4/70 707/798 |
| 2016/0292581 | A1* | 10/2016 | Voit | G06N 5/047 |
| 2017/0060994 | A1* | 3/2017 | Byron | G06F 16/3344 |
| 2017/0185674 | A1 | 6/2017 | Tonkin et al. | |
| 2018/0242149 | A1* | 8/2018 | Verma | H04L 63/08 |

FOREIGN PATENT DOCUMENTS

| | | |
|---|---|---|
| KR | 20170035961 A | 3/2017 |
| WO | 2014186873 A1 | 11/2014 |

OTHER PUBLICATIONS

Ramar, K., et al., "Technical Review on Ontology Mapping Techniques," Asian Journal of Information Technology, vol. 15, Issue: 4, 2016, 13 pages.
TR-0001-V2.4.1, "Use Cases Collection," ONEM2M Technical Report, Aug. 30, 2016, 140 pages.
TS-0012-V-0.10.0, "Base Ontology," ONEM2M Technical Specification, Jun. 2, 2016, 81 pages.
Strassner, J., et al., "A Semantic Interoperability Architecture for Internet of Things Data Sharing and Computing," XP033061081, IEEE 3rd World Forum on Internet of Things (WF-IoT), Dec. 12, 2016, pp. 609-614.
Konstantinos, K., et al., "Aligning Smart and Control Entities in the IoT," XP047014692, NEW2AN 2012: Internet of Things, Smart Spaces, and Next Generation Networking, Aug. 27, 2012, pp. 39-50.
Jacoby, M., et al., "Semantic Interoperability as Key to IoT Platform Federation," XP055685571, Interoperability and Open-Source Solutions for the Internet of Things: Second International Workshop, Nov. 7, 2016, pp. 3-19.

* cited by examiner

ONTOLOGY MANAGEMENT METHOD AND M2M PLATFORM

CROSS-REFERENCE TO RELATED APPLICATIONS

This application is a continuation of International Patent Application No. PCT/CN2018/093000 filed on Jun. 27, 2018, which claims priority to Chinese Patent Application No. 201710526858.5 filed on Jun. 30, 2017, and Chinese Patent Application No. 201710677547.9 filed on Aug. 9, 2017. All of the aforementioned patent applications are hereby incorporated by reference in their entireties.

TECHNICAL FIELD

This application relates to the field of information technologies, and in particular, to an ontology management method and an machine-to-machine (M2M) platform.

BACKGROUND

A semantic technology is a technology that describes data and an entity in a real world in order to enable a machine to understand and process the data and the entity based on a semantic descriptor. The semantic technology is introduced into M2M communication such that a resource can be semantically described. This improves capabilities of the M2M communication in terms of interoperation, resource query, data fusion processing, and knowledge inference.

An ontology is a basis of the semantic technology, and by representing and organizing knowledge in a field in a unified manner, the ontology implements knowledge sharing and reuse in the field. A semantic function in the M2M communication can be used to perform semantic annotation based on the ontology, infer more potential information based on annotated semantic data, and combine resources using the ontology.

However, there are a wide variety of vertical industries and complex standards in the M2M communication, and there is a great difference between ontologies in different industries and in different standards. Consequently, semantics are inconsistent in different industries and different standards in the M2M communication, and it is difficult to share resources in the M2M communication.

SUMMARY

This application provides an ontology management method and an M2M platform, to resolve a problem in other approaches of semantic inconsistency in different industries and different standards in M2M communication.

According to a first aspect, this application provides an ontology management method, and the method includes receiving, by a M2M platform, an ontology mapping request sent by a first application entity, where the ontology mapping request carries a first ontology identifier, a second ontology identifier, and mapping method description information, and the mapping method description information is used to specify a mapping creating manner, such as a mapping policy selection manner, a mapping algorithm selection manner, or a mapping result expression manner, determining, by the M2M platform, a first ontology and a second ontology based on the first ontology identifier and the second ontology identifier, and importing the first ontology and the second ontology, determining, by the M2M platform, a mapping manner based on the mapping method description information, and creating mapping between the first ontology and the second ontology according to the determined mapping manner, where the mapping between the first ontology and the second ontology includes mapping between a word in the first ontology and a word in the second ontology, and storing, by the M2M platform, the mapping between the first ontology and the second ontology in an ontology mapping resource, and returning an identifier of the ontology mapping resource to the first application entity.

In the foregoing technical solution, the M2M platform can create the mapping between the first ontology and the second ontology based on the request from the application entity. The mapping between the first ontology and the second ontology is not manually pre-configured, but is automatically created by the M2M platform according to the mapping manner specified in the mapping method description information. Compared with manually configuring mapping between ontologies, this method consumes less time and reduces costs. The foregoing method for creating mapping between ontologies may not be limited to being applied to a specific ontology field, but may be applied to any scenario in which mapping between ontologies needs to be created, and therefore has a wide application range. In addition, the mapping between the first ontology and the second ontology is stored in a resource (the ontology mapping resource), to help the application entity to invoke or share the mapping.

In an optional design, after storing the created mapping in the ontology mapping resource, the M2M platform may receive a semantic conversion request sent by a second application entity, where the semantic conversion request carries an identifier of a first resource and the identifier of the ontology mapping resource, the first resource references the first ontology, the semantic conversion request is used to request the M2M platform to convert a semantic descriptor that is of the first resource and that is based on the first ontology to a semantic descriptor that is based on the second ontology, and the second application entity and the first application entity are a same application entity or different application entities, the M2M platform locates the ontology mapping resource based on the identifier of the ontology mapping resource, and obtains the mapping between the first ontology and the second ontology from the ontology mapping resource, obtains the first resource based on the identifier of the first resource, determines, based on the mapping between the first ontology and the second ontology, an equivalent semantic descriptor that is of the first resource and that is based on the second ontology, and returns the equivalent semantic descriptor to the second application entity. In the foregoing technical solution, the M2M platform provides an application entity with a function of converting a resource semantic descriptor, and the application entity may query the platform for an equivalent semantic descriptor that is in the second ontology and that is of semantics in the first ontology such that the application entity understands resources that reference different ontologies.

In an optional design, after storing the created mapping in the ontology mapping resource, the M2M platform may receive a query request sent by a second application entity, where the query request carries the identifier of the ontology mapping resource and a first query statement that is based on the first ontology, and the second application entity and the first application entity are a same application entity or different application entities, the M2M platform locates the ontology mapping resource based on the identifier of the ontology mapping resource, and obtains the mapping between the first ontology and the second ontology from the ontology mapping resource, and the M2M platform queries, based on the mapping between the first ontology and the second ontology and the first query statement, a resource referencing the first ontology and a resource referencing the second ontology, to obtain a query result, and returns the query result to the second application entity. According to the foregoing technical solution, an application entity may perform, using a query statement based on one ontology, a query operation on resources that reference different ontologies rather than performing query using different query statements such that the query operation is simplified and query efficiency is improved.

In an optional design, that the M2M platform queries, based on the mapping between the first ontology and the second ontology and the first query statement, a resource referencing the first ontology and a resource referencing the second ontology, to obtain a query result includes the following implementation the M2M platform determines, based on the mapping between the first ontology and the second ontology, a second query statement that is equivalent to the first query statement and that is based on the second ontology, queries, based on the first query statement, the resource referencing the first ontology, to obtain a first query result, queries, based on the second query statement, the resource referencing the second ontology, to obtain a second query result, and uses the first query result and the second query result as the query result. The foregoing query manner has relatively high efficiency.

In an optional design, that the M2M platform queries, based on the mapping between the first ontology and the second ontology and the first query statement, a resource referencing the first ontology and a resource referencing the second ontology, to obtain a query result includes the following implementation the M2M platform determines, based on the mapping between the first ontology and the second ontology, an equivalent semantic descriptor that is of the resource referencing the second ontology and that is based on the first ontology, the M2M platform queries, based on the first query statement, the resource referencing the first ontology, to obtain a first query result, queries, based on the first query statement and the equivalent semantic descriptor, the resource referencing the second ontology, to obtain a second query result, and uses the first query result and the second query result as the query result. The foregoing query manner has relatively high efficiency.

In an optional design, after storing the created mapping in the ontology mapping resource, the M2M platform may receive a control command request sent by a second application entity, where the control command request carries an identifier of a first target device and a first control command that is based on the first ontology, the first target device references the second ontology, and the second application entity and the first application entity are a same application entity or different application entities, the M2M platform determines, based on the mapping between the first ontology and the second ontology, a second control command that is equivalent to the first control command and that is based on the second ontology, and sends the second control command to the first target device. In the foregoing technical solution, an application entity may control, according to the first control command that is based on the first ontology, the first target device that references the second ontology. This simplifies a process in which the application entity controls devices that reference different ontologies, and improves efficiency of an M2M communications system.

In an optional design, the control command request sent by the second application entity further carries the identifier of the ontology mapping resource, and after receiving the control command request, the M2M platform locates the ontology mapping resource based on the identifier of the ontology mapping resource, obtains the mapping between the first ontology and the second ontology from the ontology mapping resource, and then determines, based on the mapping between the first ontology and the second ontology, the second control command that is equivalent to the first control command and that is based on the second ontology. In the foregoing implementation, operation load of the M2M platform can be reduced, and system efficiency can be improved.

In an optional design, the control command request sent by the second application entity carries both the identifier of the first target device and an identifier of a second target device, the first target device references the second ontology, and the second target device references the first ontology. After receiving the control command request, the M2M platform determines that the ontology referenced by the second target device is the same as the ontology on which the first control command is based, and may directly send the first control command to the second target device. In addition, the M2M platform determines that the second ontology referenced by the first target device is different from the first ontology on which the first control command is based, determines the second control command that is equivalent to the first control command and that is based on the second ontology, and sends the second control command to the first target device. In the foregoing technical solution, devices that reference different ontologies can be controlled using one control command such that the devices that reference different ontologies can work cooperatively, thereby improving efficiency of an M2M communications system.

In an optional design, the mapping method description information may include a mapping policy parameter, and the M2M platform determines a mapping algorithm policy based on the mapping policy parameter, where the mapping algorithm policy includes any one of a single mapping algorithm policy, a multi-mapping algorithm policy, and an algorithm traversal policy, the single mapping algorithm policy is used to determine a single mapping algorithm as an algorithm of the mapping between the first ontology and the second ontology, the multi-mapping algorithm policy is used to determine at least two mapping algorithms as algorithms of the mapping between the first ontology and the second ontology, and the algorithm traversal policy is used to determine that the mapping between the first ontology and the second ontology is created by traversing all mapping algorithms. In some implementations, the mapping policy parameter in the mapping method description information may be default, and the M2M platform may determine that the mapping algorithm policy is a preset policy, for example, the single mapping algorithm policy. In the foregoing technical solution, an application entity may provide the mapping algorithm policy used for the mapping between the first ontology and the second ontology, and instruct the M2M platform to determine a manner of mapping between the first ontology and the second ontology based on the mapping algorithm policy provided by the application entity in order to obtain mapping that satisfies a user requirement.

In an optional design, the M2M platform may determine the algorithm of the mapping between the first ontology and the second ontology based on the mapping algorithm policy and at least two preset mapping algorithms, where the at least two preset mapping algorithms include at least two of a linguistic feature extraction algorithm, a structural feature extraction algorithm, an external resource obtaining algorithm, and a logical reasoning algorithm. The mapping algorithm policy may be provided by an application entity, or may be a default mapping algorithm policy predefined by the M2M platform. In addition, a mapping algorithm or mapping algorithms that is/are further used may be specified by the application entity using the mapping method description information. In the foregoing technical solution, the application entity may provide the mapping algorithm used for the mapping between the first ontology and the second ontology, and instruct the M2M platform to determine a manner of mapping between the first ontology and the second ontology based on the mapping algorithm provided by the application entity in order to obtain mapping that satisfies a user requirement.

In an optional design, the mapping method description information may include a mapping evaluation parameter, and the M2M platform determines, based on the mapping evaluation parameter, a mapping result evaluation manner, where the evaluation manner includes an interactive evaluation mode or an automatic threshold mode, the interactive evaluation mode is used to determine that a mapping result is evaluated through interaction between the M2M platform and the first application entity, and the automatic threshold mode is used to determine that the M2M platform evaluates a mapping result based on a preset threshold. In some possible implementations, the mapping evaluation parameter in the mapping method description information may be default, and the M2M platform determines that the mapping result evaluation manner is a preset evaluation manner, for example, the automatic threshold mode. In the foregoing technical solution, the application entity may provide the mapping result evaluation manner, and instruct the M2M platform to evaluate a mapping result of the first ontology and the second ontology based on the evaluation manner provided by the application entity in order to obtain mapping that satisfies a user requirement.

In an optional design, the mapping method description information may include a mapping expression parameter, and the M2M platform determines a mapping result expression manner based on the mapping expression parameter. The mapping result expression manner may include a mapping relationship description manner, and the mapping relationship description manner may be as follows "equivalent" (indicating that concepts of two ontologies are completely consistent), "including" (indicating that concepts of two ontologies are in a hyponymy parent-child relationship), "compatible" (indicating that concepts of two ontologies have similar parts but are not completely equivalent), and "irrelevant" (indicating that concepts of two ontologies have no mapping relationship). The mapping result expression manner may further include an ontology syntax format (or an ontology mode). The ontology syntax format is a manner of organizing information, and may be a world wide web ontology language (OWL), a contextualized OWL (C-OWL), a simple knowledge organization system (SKOS), a rule interchange format (RIF), a semantic web rule language (SWRL), or the like. In the foregoing technical solution, the application entity may provide the mapping result expression manner, and instruct the M2M platform to express a mapping result of the first ontology and the second ontology based on the expression manner provided by the application entity in order to obtain mapping that satisfies a user requirement.

According to a second aspect, this application provides an M2M platform, where the M2M platform is configured to perform the method in any one of the first aspect or the possible implementations of the first aspect. Further, the M2M platform includes a module configured to perform the method in any one of first aspect or possible implementations of the first aspect.

According to a third aspect, this application provides an M2M platform, where the M2M platform is configured to perform the method in any one of the first aspect or the possible implementations of the first aspect. Further, the M2M platform includes a processor, a memory, and a communications interface. The memory stores a computer instruction, and the communications interface is configured to communicate with an application entity. The processor is connected to the memory and the communications interface, and is configured to invoke the computer instruction stored in the memory and the communications interface, to perform the method in any one of the first aspect or the possible implementations of the first aspect.

According to a fourth aspect, this application provides a computer readable storage medium, where the readable storage medium stores a computer instruction, and when the instruction is run on a computer, the computer is enabled to perform the method in any one of the first aspect or the possible implementations of the first aspect.

According to a fifth aspect, this application provides a computer program product, where when the computer program product is run on a computer, the computer is enabled to perform the method in any one of the first aspect or the possible implementations of the first aspect.

DESCRIPTION OF EMBODIMENTS

To make the objectives, technical solutions, and advantages of this application clearer, the following further describes this application in detail with reference to the accompanying drawings.

In this application, "a plurality of" refers to two or more. In addition, it should be understood that, in the descriptions of this application, terms such as "first" and "second" are used only for distinguishing and description, but cannot be understood as indicating or implying relative importance, or indicating or implying an order.

Figure 1:
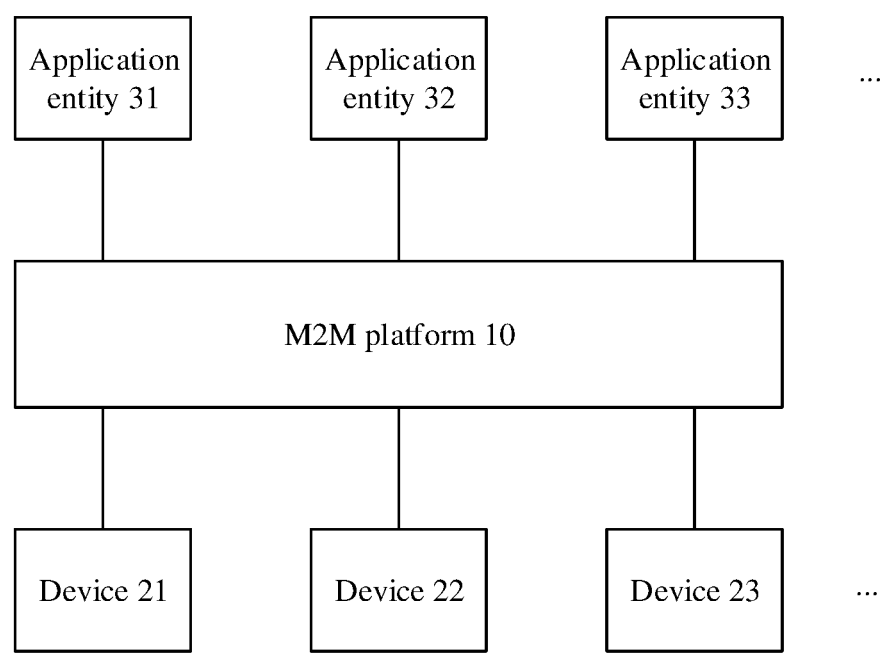
FIG. 1 is a schematic diagram of an M2M communications system.

This application may be applied to M2M communication, for example, M2M communication based on a one M2M standard, or M2M communication based on a standard specified by the European telecommunications standards organization (ETSI). FIG. 1 is a schematic diagram of an M2M communications system. An M2M platform 10 is configured to provide a common capability, for example, data access and storage, data sharing and transmission, group communication, data subscription notification, security, charging, and resource discovery. The M2M platform 10 may access different types of M2M devices, for example, devices 21 to 23 in FIG. 1. These devices may be application service nodes (ASN) or application dedicated nodes (ADN). The M2M platform 10 may further provide an application access interface, to allow applications in different vertical industries to invoke, through the access interface, the common capability provided by the M2M platform 10. In the M2M communication field, an application is also referred to as an AE, for example, AEs 31 to 33 in FIG. 1.

In M2M communication, each physical entity (for example, a terminal device) and each logic entity (for example, an AE or information) may be abstracted as a resource. The resource may include a subresource and an attribute, and the attribute is a specific description of the resource, and is used to store specific data of the resource.

An ontology "ontology" may provide a word (term) for describing a resource, and it is usually considered that a concept of the ontology includes four main aspects.

(1) Conceptualization. The conceptualization refers to an information model of an objective world phenomenon.

(2) Explicit. Concepts and a relationship between the concepts are explicitly defined.

(3) Formalization (formal). The relationship between the concepts can be read by a computer.

(4) Share. An ontology is common recognized knowledge and reflects a set of concepts that are acknowledged in a related field.

Figure 2:
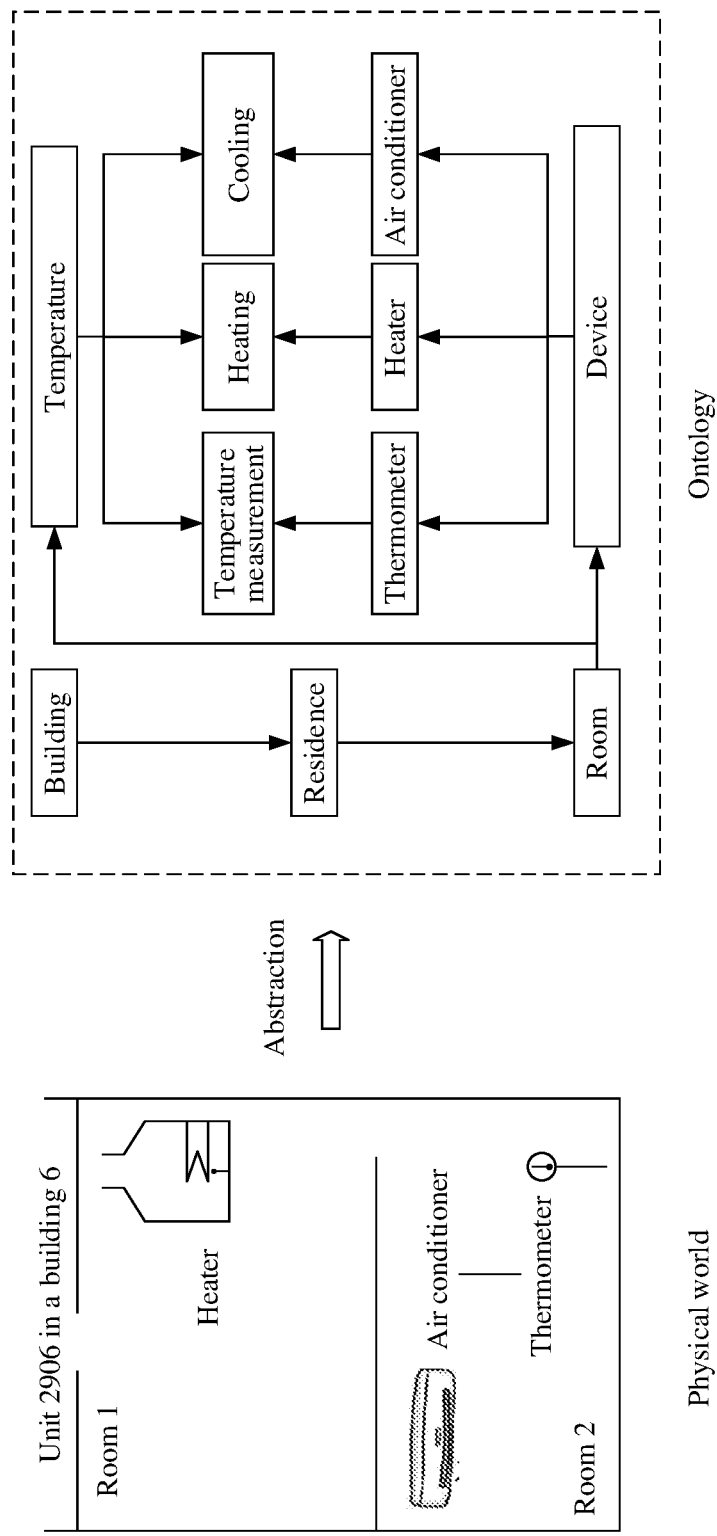
FIG. 2 is a schematic diagram of an ontology.

An objective of an ontology is to capture knowledge in a related field, provide a common understanding about the knowledge in the field, determine words commonly recognized in the field, and provide clear definitions of these words and a relationship between the words in a formalized mode at different layers. Referring to FIG. 2, a unit 2906 in a building 6 in the real world is abstracted to obtain a model of an ontology in the M2M communication field. For the ontology, shared words (such as building, room, device, and temperature) may be used to express, in a formalized manner, concepts or the like in the household appliance field in the physical world and a relationship between the concepts.

Figure 3A:
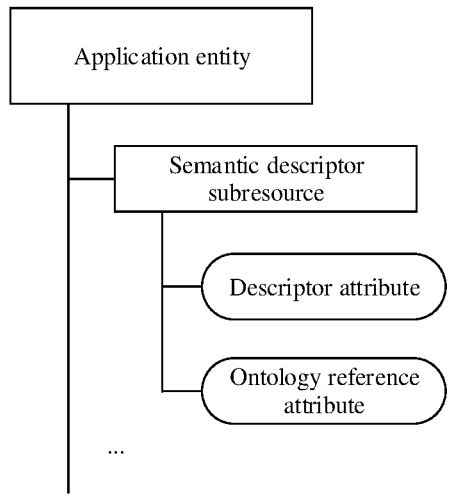
FIG. 3A is a schematic structural diagram of resources of an application entity (AE).
Figure 3B:
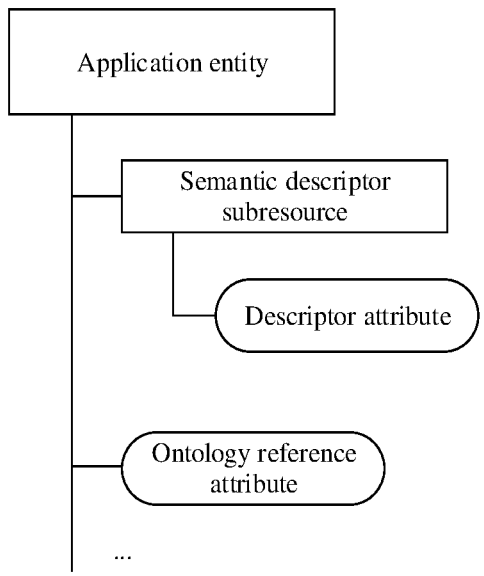
FIG. 3B is a schematic structural diagram of resources of an AE.

A resource may reference an ontology, and a device in the M2M communications system may understand semantics of the resource and a relationship between the resource and another resource based on the ontology. For example, FIG. 3A shows a resource structure of an application entity AE in the M2M communications system. The AE includes a semantic descriptor subresource. The semantic descriptor subresource is used to describe semantic information of the AE such that another application entity can determine, using the semantic descriptor subresource, a function and an executable operation that are provided by the AE, and can also determine a meaning of data provided by the AE, for example, a data type or a unit. This implements data sharing between different application entities. The semantic descriptor subresource includes a descriptor attribute, and the descriptor attribute stores semantic triplet information, namely, a subject, a relationship, and an object. The semantic descriptor subresource may further include an ontology reference (ontologyRef) attribute, indicating an identifier of an ontology referenced by the semantic descriptor subresource, for example, a uniform resource identifier (URI) of the ontology. In some implementations, referring to FIG. 3B, the ontologyRef attribute may alternatively be used as an attribute of the AE directly.

Currently, there are a wide variety of vertical industries and complex standards in M2M communication, and there is a great difference between ontologies in different industries and in different standards. Consequently, semantics are inconsistent in different industries and different standards in the M2M communication. In an existing solution, a rule of mapping between two different ontologies is preset, and semantic conversion between the different ontologies is performed according to the mapping rule. However, because there are a large quantity of ontologies in the M2M communication field, it is difficult to configure mapping rules for different ontologies, and costs are excessively high.

An embodiment of this application provides an ontology management method and an M2M platform, to resolve a problem in other approaches of semantic inconsistency in different industries and different standards in M2M communication. The method and the M2M platform are based on a same disclosure concept. Because problem-resolving principles of the method and the M2M platform are similar, implementation of the M2M platform and implementation of the method may be mutually referenced. Repeated parts are not described.

Figure 4:
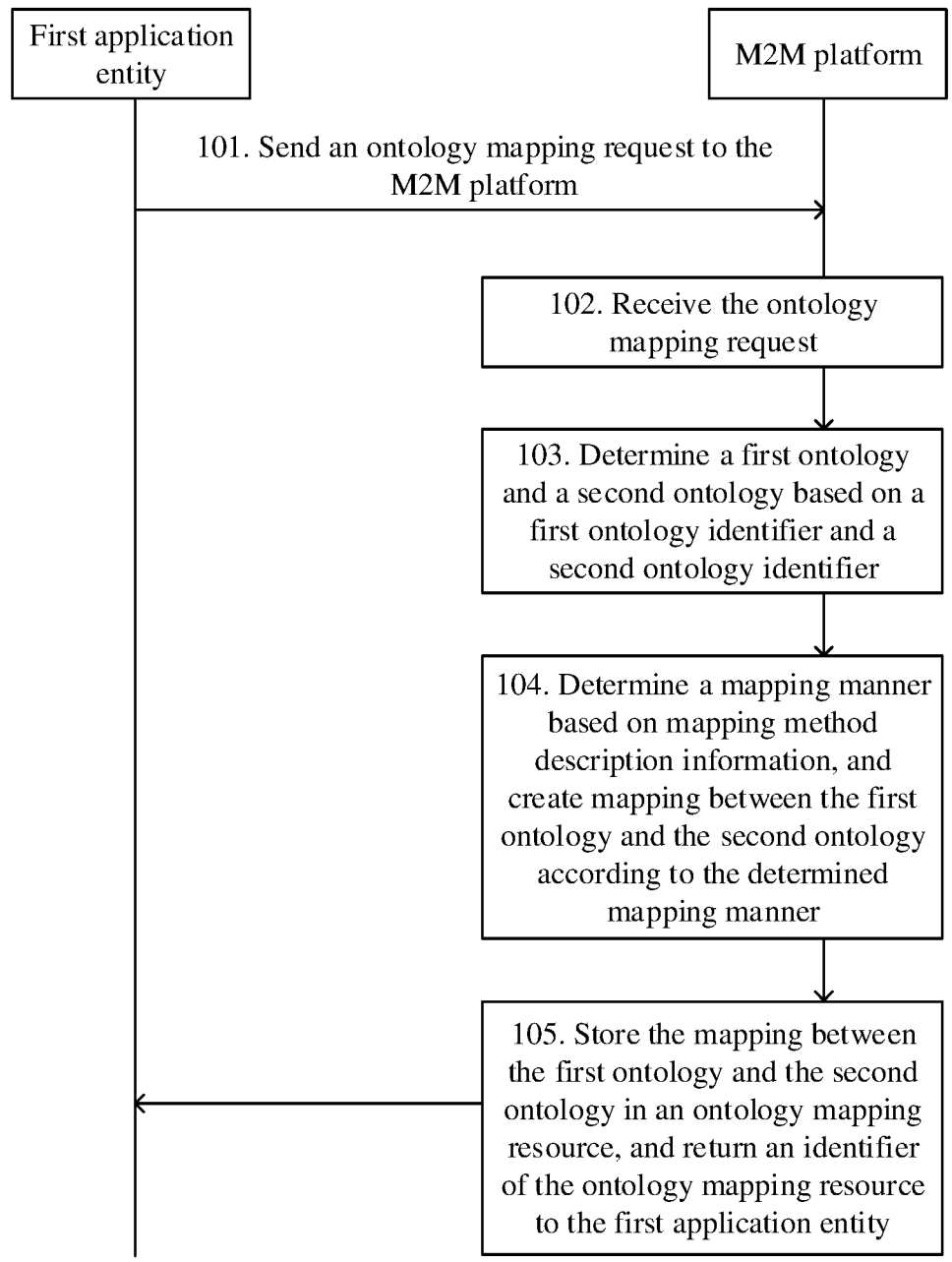
FIG. 4 is a schematic flowchart of an ontology management method according to an embodiment of this application.

FIG. 4 is a schematic flowchart of an ontology management method according to an embodiment of this application. The method includes the following steps.

Step 101. A first application entity sends an ontology mapping request to an M2M platform. The ontology mapping request carries a first ontology identifier, a second ontology identifier, and mapping method description information. A first ontology and the second ontology are two ontologies between which mapping needs to be created, and the mapping method description information is used to specify a mapping creation manner, for example, a mapping policy selection manner, a mapping algorithm selection manner, or a mapping result expression manner.

Step 102. The M2M platform receives the ontology mapping request.

Step 103. The M2M platform determines the first ontology and the second ontology based on the first ontology identifier and the second ontology identifier.

In an M2M communications system, each ontology has a unique identifier. The M2M platform may locate the first ontology based on the first ontology identifier, and locate the second ontology based on the second ontology identifier, to import the first ontology and the second ontology. The first ontology and the second ontology may be located in a storage unit (for example, a magnetic disk) of the M2M platform, or may be located in another storage device other than the M2M platform. In addition, the first ontology and the second ontology may be located in a same ontology library, or may be located in different ontology libraries. The ontology library is a set of a plurality of ontologies.

Step 104. The M2M platform determines a mapping manner based on the mapping method description information, and creates mapping between the first ontology and the second ontology according to the determined mapping manner.

The foregoing mapping manner is a rule of mapping between two ontologies. Optionally, the mapping manner further includes a mapping result evaluation manner, for example, whether a mapping result is acceptable or unacceptable. Optionally, the mapping manner further includes a mapping result expression manner.

Figure 5:
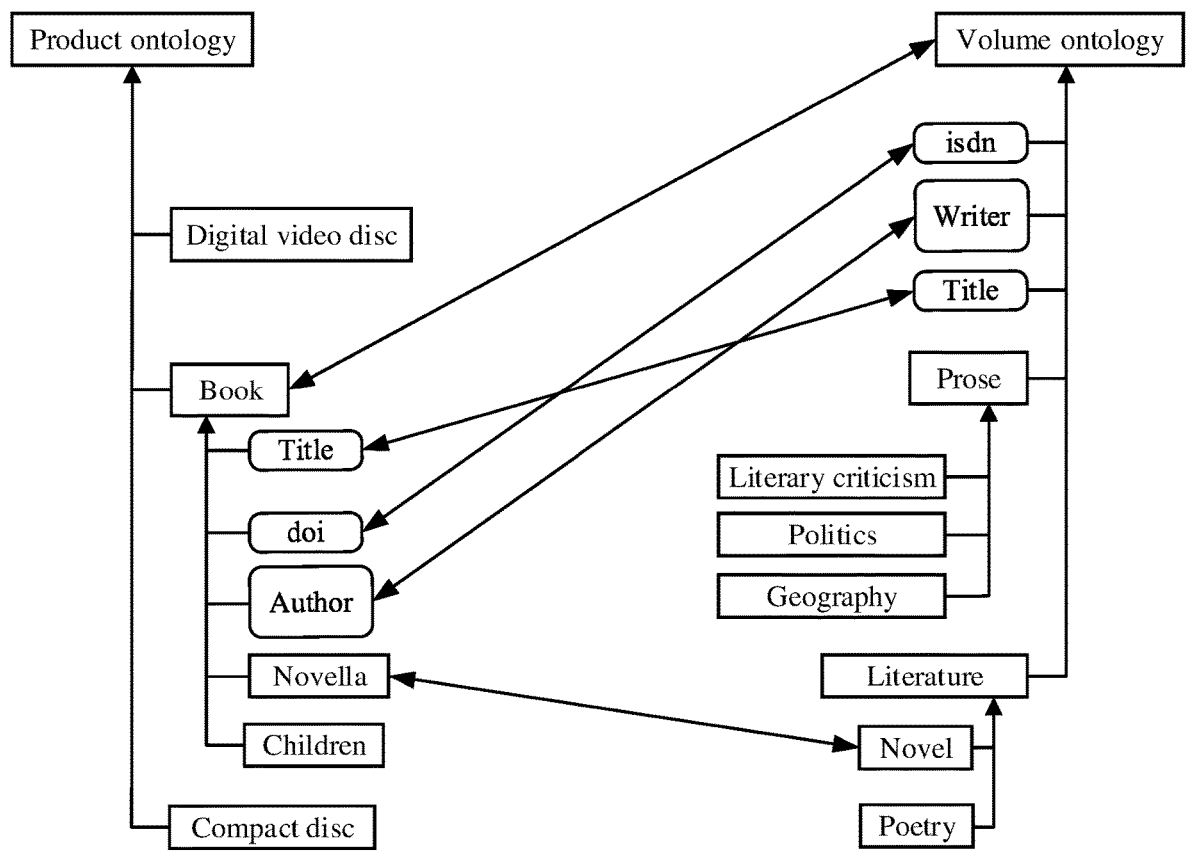
FIG. 5 is a schematic diagram of mapping between a "product" ontology and a "volume" ontology.

The mapping between the first ontology and the second ontology includes mapping between a word in the first ontology and a word in the second ontology. FIG. 5 is a schematic diagram of mapping between a "product" ontology and a "volume" ontology. The "product" ontology is used to describe an attribute of a book or an audio/video, and the "volume" ontology is used to describe an attribute of a book. It can be learned from the figure that a "book" subresource of the "product" ontology is equivalent to the "volume" ontology, a "title" attribute of the "book" subresource is equivalent to a "title" attribute of the "volume" ontology, a "doi" attribute of the "book" subresource is equivalent to an "isdn" attribute of the "volume" ontology, an "author/author" attribute of the "book" subresource is equivalent to a "writer/writer" attribute of the "volume" ontology, and a "novella" attribute of the "book" subresource is equivalent to a "novel" subresource of the "volume" ontology. The "product" ontology further includes a digital video disc (DVD) subresource and a compact disc (CD) subresource.

Step 105. The M2M platform stores the mapping between the first ontology and the second ontology in an ontology mapping resource, and returns an identifier of the ontology mapping resource to the first application entity. The mapping between the first ontology and the second ontology may be used as an attribute or a subresource of the ontology mapping resource.

In the foregoing technical solution, the M2M platform can create the mapping between the first ontology and the second ontology based on the request from the application entity. The mapping between the first ontology and the second ontology is not manually pre-configured, but is automatically created by the M2M platform according to the mapping manner specified in the mapping method description information. Compared with manually configuring mapping between ontologies, this technical solution is less time consuming and reduces costs. The foregoing method for creating mapping between ontologies may not be limited to being applied to a specific ontology field, but may be applied to any scenario in which mapping between ontologies needs to be created, and therefore has a wide application range. In addition, the mapping between the first ontology and the second ontology is stored in a resource (the ontology mapping resource), to help the application entity to invoke or share the mapping.

In this embodiment of this application, the M2M platform may determine the mapping manner based on the mapping method description information in a plurality of implementations, including but not limited to the following manners.

Manner 1. The mapping method description information in the ontology mapping request is default, and the M2M platform determines to create the mapping between the first ontology and the second ontology in a preset mapping manner. In other words, the first application entity notifies the M2M platform that two ontologies between which mapping needs to be created are the first ontology and the second ontology, but does not indicate a mapping manner for creating the mapping. The M2M platform creates the mapping between the first ontology and the second ontology in the preset mapping manner.

Manner 2. The mapping method description information in the ontology mapping request includes a parameter for determining a mapping manner, and the M2M platform determines the mapping manner based on the parameter in the mapping method description information. It should be noted that, a plurality of parameters may be used to determine the mapping manner, the mapping method description information may include some parameters in the plurality of parameters, and the other parameters are default. Therefore, the M2M platform may determine the default parameters as preset values, and determine the mapping manner based on the preset values and the parameters included in the mapping method description information. For example, the mapping method description information includes a mapping policy parameter, and a value of the mapping policy parameter is a "single mapping algorithm policy". The M2M platform may determine to use the single mapping algorithm to perform ontology mapping. However, a mapping algorithm parameter in the mapping method description information is default, to be specific, the first application entity does not specify a specific algorithm that is to be used, and the M2M platform determines that the mapping algorithm is a default algorithm, for example, a linguistic feature algorithm.

In the foregoing technical solution, the application entity may specify all or some parameters for determining a mapping manner, or may not specify a parameter for determining a mapping manner. In both the cases, the M2M platform can determine a manner of mapping between ontologies. The technical solution is more flexibly implemented, and in the technical solution, a manner in which the application entity requests to create mapping between ontologies is flexible and convenient.

Optionally, that the M2M platform determines the mapping manner based on the parameter in the mapping method description information includes determining, by the M2M platform, a mapping algorithm policy based on a mapping policy parameter in the mapping method description information.

A plurality of mapping algorithms may be used for mapping between ontologies, and the mapping algorithm policy is a manner of using the plurality of mapping algorithms. The mapping policy parameter may include a single mapping algorithm policy, a multi-mapping algorithm policy, or an algorithm traversal policy. The single mapping algorithm policy is used to determine a single mapping algorithm as an algorithm of the mapping between the first ontology and the second ontology, the multi-mapping algorithm policy is used to determine at least two mapping algorithms as algorithms of the mapping between the first ontology and the second ontology, and the algorithm traversal policy is used to determine that the mapping between the first ontology and the second ontology is created by traversing all mapping algorithms. In some embodiments, the mapping policy parameter in the mapping method description information may be default, and the M2M platform may determine that the mapping algorithm policy is a preset policy, for example, the single mapping algorithm policy.

In the foregoing technical solution, the application entity may provide the mapping algorithm policy used for the mapping between the first ontology and the second ontology, and instruct the M2M platform to determine a manner of mapping between the first ontology and the second ontology based on the mapping algorithm policy provided by the application entity in order to obtain mapping that satisfies a user requirement.

Optionally, that the M2M platform determines the mapping manner based on the parameter in the mapping method description information includes determining, by the M2M platform, the mapping between the first ontology and the second ontology based on a determined mapping algorithm policy and at least two preset mapping algorithms, where the at least two preset mapping algorithms include at least two of a linguistic feature extraction algorithm, a structural feature extraction algorithm, an external resource obtaining algorithm, and a logical reasoning algorithm, where for implementations of the foregoing various algorithms, refer to implementations of the various algorithms in other approaches.

The mapping algorithm policy may be provided by the application entity, or may be a default mapping algorithm policy predefined by the M2M platform. In this embodiment of this application, a mapping algorithm or mapping algorithms that is/are further used may be specified by the application entity using the mapping method description information. For example, when the mapping algorithm policy is the multi-mapping algorithm policy, the application entity may add specified mapping algorithms to the mapping method description information to serve as the linguistic feature extraction algorithm and the structural feature extraction algorithm. In some embodiments, the application entity may specify no mapping algorithm. For example, when the mapping algorithm policy is the single mapping algorithm policy, the mapping algorithm parameter in the mapping algorithm description information is default, and the M2M platform determines to use the preset linguistic feature extraction algorithm as the mapping algorithm.

In the foregoing technical solution, the application entity may provide the mapping algorithm used for the mapping between the first ontology and the second ontology, and instruct the M2M platform to determine a manner of mapping between the first ontology and the second ontology based on the mapping algorithm provided by the application entity in order to obtain mapping that satisfies a user requirement.

Optionally, that the M2M platform determines the mapping manner based on the parameter in the mapping method description information includes determining, by the M2M platform, a mapping result evaluation manner based on a mapping evaluation parameter in the mapping method description information. The evaluation manner may include an interactive evaluation mode or an automatic threshold mode. The interactive evaluation mode means that a mapping result is evaluated through interaction between the M2M platform and the first application entity. For example, after obtaining a preliminary result of mapping between the first ontology and the second ontology according to the mapping manner, the M2M platform feeds back the preliminary mapping result to the first application entity, and the first application entity evaluates whether the mapping result satisfies a requirement. If the mapping result satisfies the requirement, the M2M platform determines that the mapping ends, if the mapping result does not satisfy the requirement, the M2M platform continues to perform a mapping operation. For example, the M2M platform adjusts the mapping algorithm or the manner of using the mapping algorithm to perform remapping. For another example, the M2M platform performs next mapping based on the current preliminary mapping result until a mapping result is confirmed by the application entity. The automatic threshold mode means that the M2M platform evaluates the mapping result based on a preset threshold. The preset threshold may be configured by the M2M platform, or may be added by the application entity to the mapping method description information, or may be specified by an M2M communications protocol. In some embodiments, the mapping evaluation parameter in the mapping method description information may be default, and the M2M platform determines that the mapping result evaluation manner is a preset evaluation manner, for example, the automatic threshold mode.

In the foregoing technical solution, the application entity may provide the mapping result evaluation manner, and instruct the M2M platform to evaluate a result of mapping between the first ontology and the second ontology based on the evaluation manner provided by the application entity in order to obtain mapping that satisfies a user requirement.

Optionally, that the M2M platform determines the mapping manner based on the parameter in the mapping method description information includes determining, by the M2M platform, a mapping result expression manner based on a mapping expression parameter in the mapping method description information.

The mapping result expression manner may include a mapping relationship description manner, and the mapping relationship description manner may be as follows "equivalent" (indicating that concepts of two ontologies are completely consistent), "including" (indicating that concepts of two ontologies are in a hyponymy parent-child relationship), "compatible" (indicating that concepts of two ontologies have similar parts but are not completely equivalent), and "irrelevant" (indicating that concepts of two ontologies have no mapping relationship).

The mapping result expression manner may further include an ontology syntax format (or an ontology mode). The ontology syntax format is a manner of organizing information, and may be an OWL, a C-OWL, a SKOS, a RIF, a SWRL, or the like.

In the foregoing technical solution, the application entity may provide the mapping result expression manner, and instruct the M2M platform to express a result of mapping between the first ontology and the second ontology based on the expression manner provided by the application entity in order to obtain mapping that satisfies a user requirement.

Figure 6:
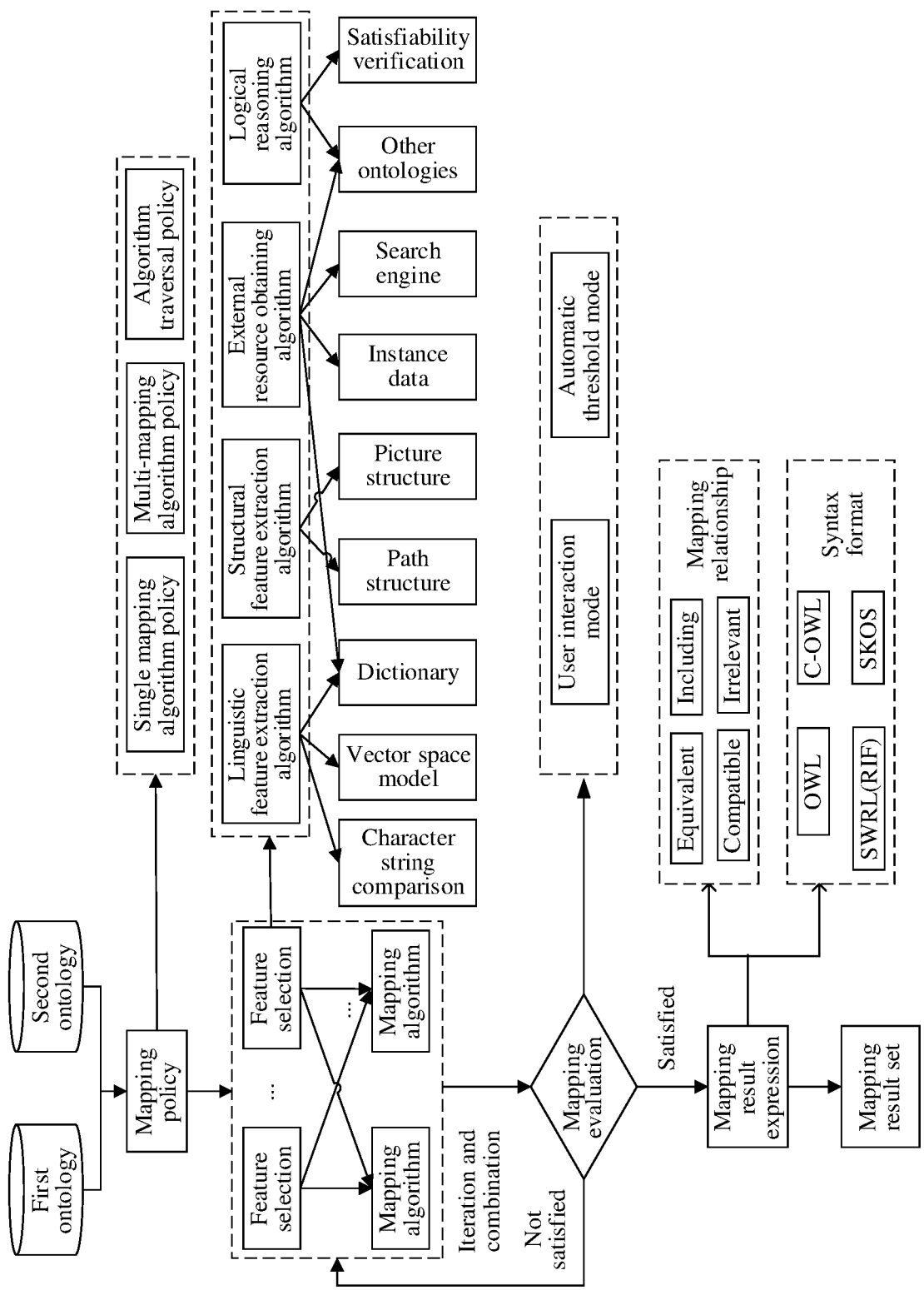
FIG. 6 is a schematic diagram of ontology mapping according to an embodiment of this application.

FIG. 6 is a schematic diagram of ontology mapping according to an embodiment of this application. After obtaining a first ontology and a second ontology between which mapping needs to be created, the M2M platform first determines a mapping policy, and then determines, based on the determined mapping policy, an algorithm for performing mapping. The algorithm may be a single algorithm or a combination of a plurality of algorithms, and this depends on selection of the mapping policy. After the mapping algorithm is determined, mapping is performed between the first ontology and the second ontology according to the algorithm, a mapping result is evaluated, a mapping result expression manner is determined, and the mapping result is stored in a mapping result set (ontologymappingmuster).

FIG. 6 shows a plurality of mapping algorithms, including the following mapping algorithms.

Character string comparison algorithm. Use a semantic descriptor of an ontology concept term as a character string, and obtain similarity between concept terms through comparison of differences between character strings.

Vector space model algorithm. Describe an ontology concept term using a set of a plurality of basic words, constitute a vector space using a set of a plurality of word vectors, and express similarity between ontology concepts through comparison (co-occurred words) between vector spaces.

Dictionary mapping algorithm. Search for a mapping relationship between ontology concepts or expand ontology concepts by querying an acknowledged dictionary.

Graphic structure algorithm. Consider ontology mapping from a perspective of a graphic structure, and express similarity between ontology concepts using a mature graphic similarity propagation algorithm.

Path structure algorithm. This can be understood as a 1-dimension graphic structure algorithm.

Logical reasoning based on another ontology. First map two to-be-mapped ontologies to acknowledged background knowledge ontologies, and then infer a mapping relationship between the to-be-mapped ontologies based on a concept relationship between the background knowledge ontologies.

Logical reasoning based on satisfiability verification. An OWL ontology is based on logic of a descriptor, and therefore has model-theoretic semantics. In the logical reasoning based on the satisfiability verification, a mapping unit is verified and inferred using the model-theoretic semantics.

Search engine algorithm. Search for similarity between to-be-mapped ontologies using an external acknowledged search engine.

Figure 7:
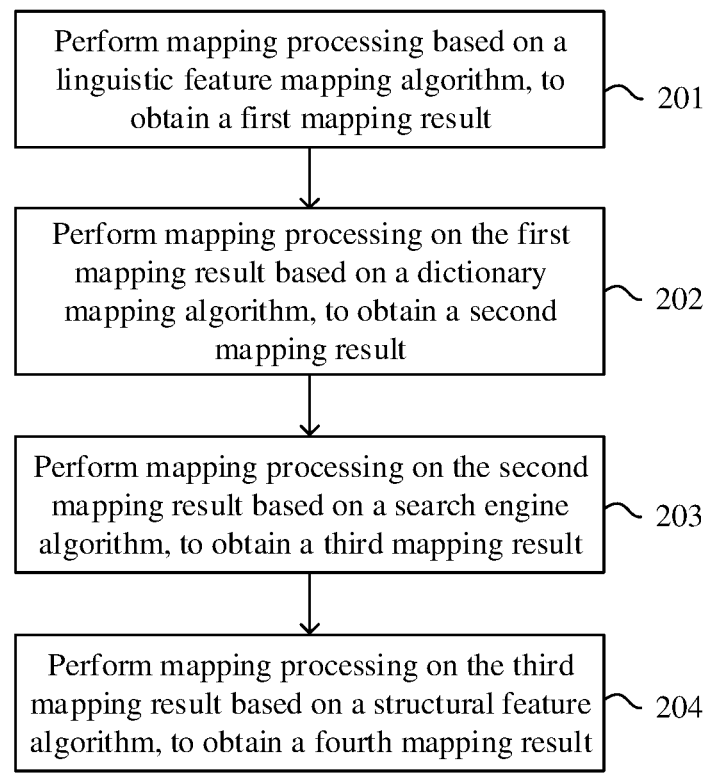
FIG. 7 is a schematic diagram of a mapping process between a first ontology and a second ontology.

Optionally, that the M2M platform performs the mapping between the first ontology and the second ontology according to the mapping algorithm may be a cyclic iteration process. FIG. 7 shows a possible implementation of a mapping process between the first ontology and the second ontology. The mapping process includes the following steps.

Step 201. Perform mapping processing based on a linguistic feature mapping algorithm, to obtain a first mapping result.

Step 202. Perform mapping processing on the first mapping result based on a dictionary mapping algorithm, to obtain a second mapping result.

Step 203. Perform mapping processing on the second mapping result based on a search engine algorithm, to obtain a third mapping result.

Step 204. Perform mapping processing on the third mapping result based on a structural feature algorithm, to obtain a fourth mapping result.

Figure 8:
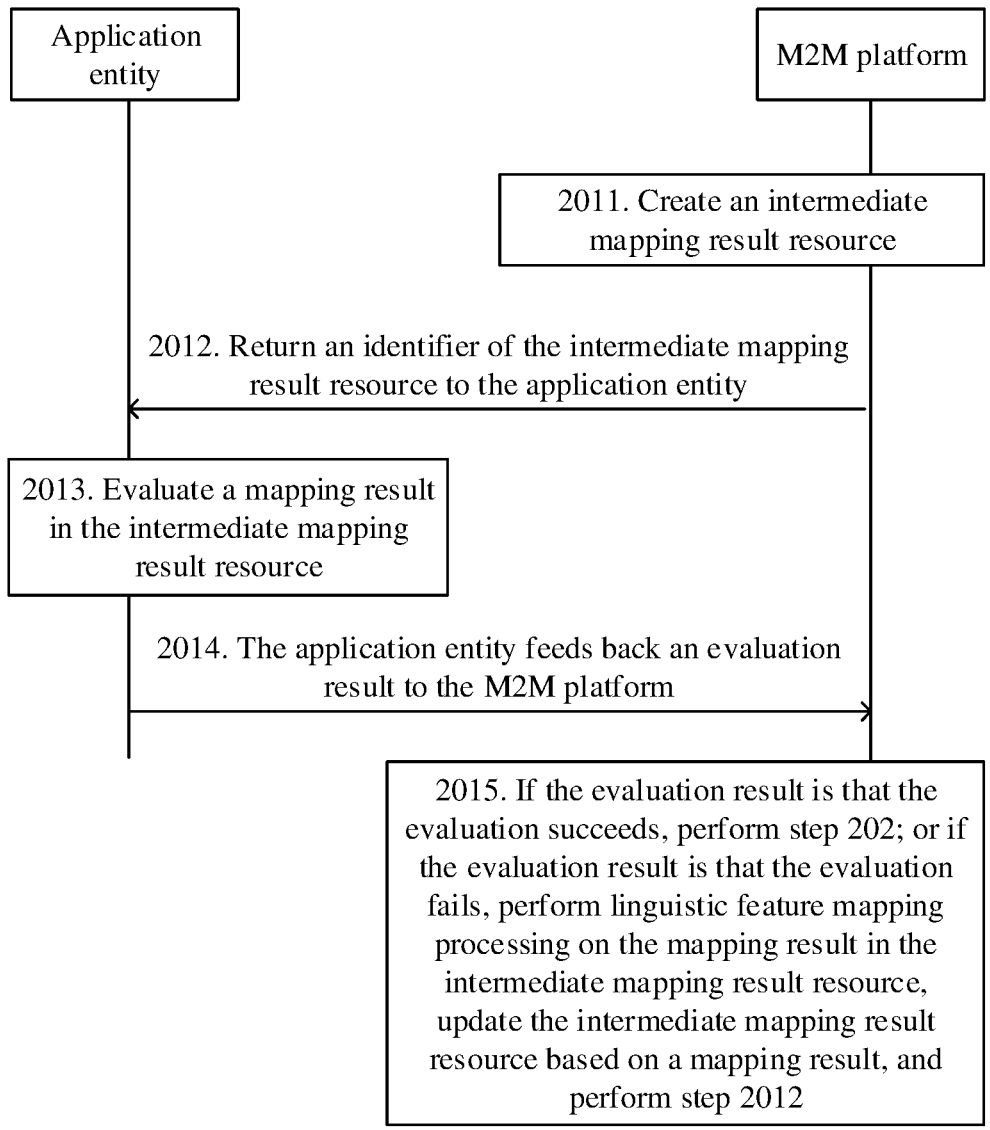
FIG. 8 is a schematic diagram of a linguistic feature mapping process.

Each of the foregoing steps may include mapping result evaluation, and a next step of mapping is performed only after a mapping result satisfies a requirement. When a mapping result does not satisfy a requirement, mapping processing continues to be performed on the current mapping result. Referring to FIG. 8 and using step 201 as an example, a linguistic feature mapping process includes the following steps.

Step 2011. The M2M platform creates an intermediate mapping result resource, where the intermediate mapping result resource includes a result of current linguistic feature mapping.

Step 2012. The M2M platform returns an identifier of the intermediate mapping result resource to an application entity.

Step 2013. The application entity obtains the intermediate mapping result resource based on the identifier of the intermediate mapping result resource, and evaluates the mapping result in the intermediate mapping result resource.

Step 2014. The application entity feeds back an evaluation result to the M2M platform, where the evaluation result may be represented using an NEXT parameter, and if a value of the NEXT parameter is 0, it indicates that the evaluation fails, or if a value of the NEXT parameter is 1, it indicates that the evaluation succeeds.

Step 2015. If the evaluation result is that the evaluation succeeds, the M2M platform ends linguistic feature mapping, and performs step 202, or if the evaluation result is that the evaluation fails, the M2M platform performs linguistic feature mapping processing on the mapping result in the intermediate mapping result resource, updates the intermediate mapping result resource based on the mapping result, and performs step 2012.

In the foregoing technical solution, the M2M platform may implement mapping between ontologies through iteration of a plurality of mapping algorithms. In addition, in mapping based on each algorithm, cyclic mapping may also be performed until a mapping result succeeds in mapping evaluation. The mapping result obtained using the foregoing solution is more reliable and more accurate.

Figure 9A:
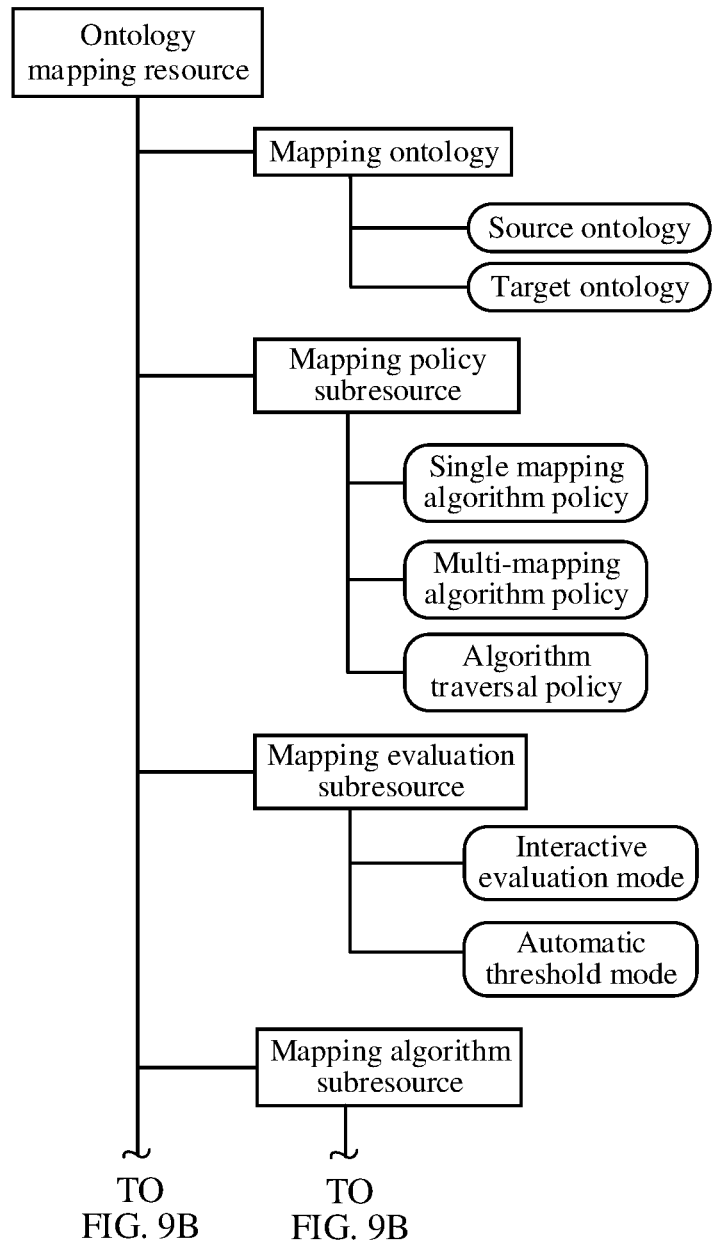
FIG. 9A is a schematic structural diagram of an ontology mapping resource.
Figure 9B:
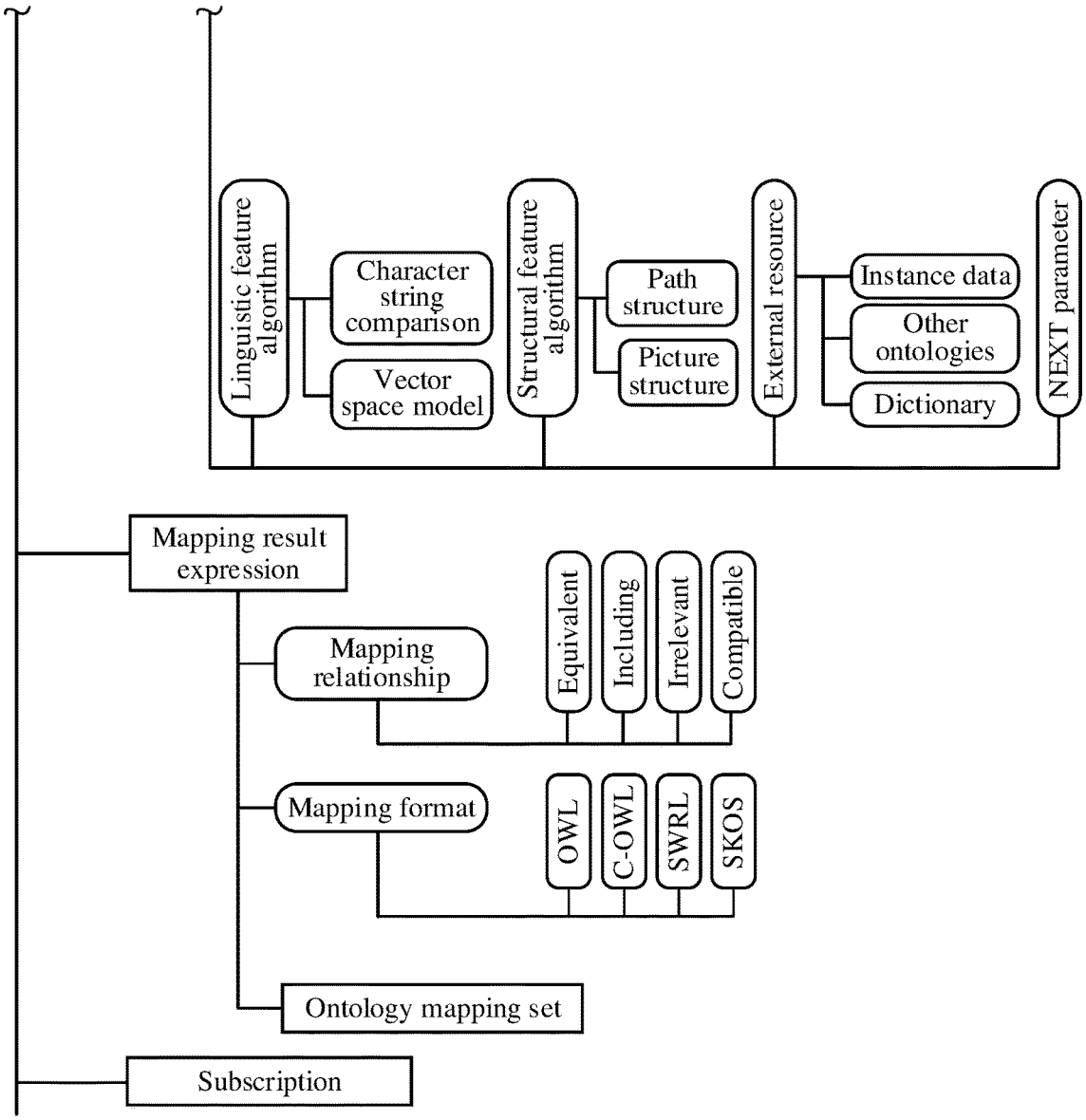
FIG. 9B is a schematic structural diagram of an ontology mapping resource.

FIG. 9A and FIG. 9B are a schematic structural diagram of an ontology mapping resource. A box in the figure represents a resource (including a subresource), and an ellipse represents an attribute. Meanings of the subresources and the attributes in FIG. 9A and FIG. 9B are already described above, and are not repeated herein.

Figure 10:
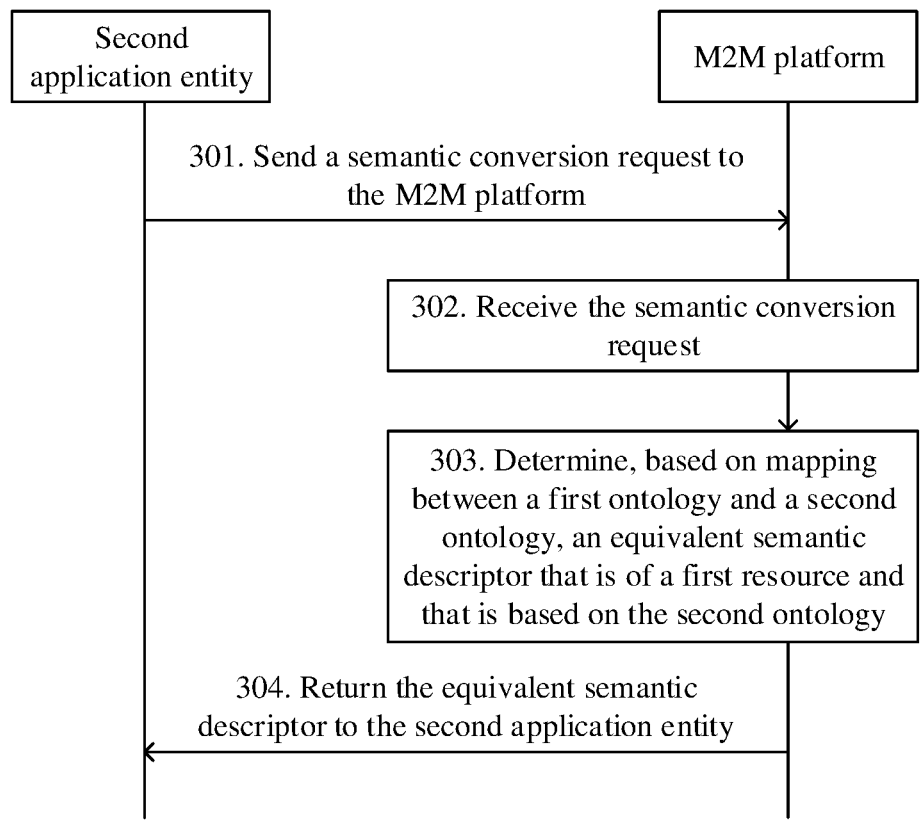
FIG. 10 is another schematic flowchart of an ontology management method according to an embodiment of this application.

Optionally, referring to FIG. 10, an ontology management method according to an embodiment of this application further includes the following steps.

Step 301. A second application entity sends a semantic conversion request to the M2M platform, where the semantic conversion request carries an identifier of a first resource and the identifier of the ontology mapping resource, the first resource references the first ontology, and a device in the M2M communications system can understand the first resource based on the first ontology. The semantic conversion request is used to request the M2M platform to convert a semantic descriptor that is of the first resource and that is based on the first ontology into a semantic descriptor that is based on the second ontology.

The second application entity may be the foregoing first application entity, or may be another application entity other than the first application entity. When the second application entity is different from the first application entity, a manner of obtaining the identifier of the ontology mapping resource by the second application entity may be as follows. In a first manner, the first application entity sends the identifier of the ontology mapping resource to the second application entity, or the second application entity sends a request to the first application entity to obtain the identifier of the ontology mapping resource. In a second manner, after storing the mapping between the first ontology and the second ontology in the ontology mapping resource, the M2M platform configures the identifier of the ontology mapping resource as a common resource, and the second application entity may obtain the identifier of the ontology mapping resource. In a third manner, after storing the mapping between the first ontology and the second ontology in the ontology mapping resource, the M2M platform stores the identifier of the ontology mapping resource in local or in an external storage device, and the second application entity obtains the ontology mapping resource from the M2M platform or the external storage device by providing authentication information.

Step 302. The M2M platform receives the semantic conversion request, obtains the identifier of the ontology mapping resource from the semantic conversion request, locates the ontology mapping resource based on the identifier of the ontology mapping resource, and obtains the mapping between the first ontology and the second ontology from the ontology mapping resource.

Step 303. The M2M platform obtains the first resource based on the identifier of the first resource, and determines, based on the mapping between the first ontology and the second ontology, an equivalent semantic descriptor that is of the first resource and that is based on the second ontology. For example, the first resource is a book, a writer of the book is Jim Hendler, and a word corresponding to a book writer in the first ontology is "author". Therefore, the semantic descriptor that is of the first resource and that is based on the first ontology includes "author: Jim Hendler". A word corresponding to a book writer in the second ontology is "writer". Therefore, the equivalent semantic descriptor that is of the first resource and that is based on the second ontology includes: "writer: Jim Hendler".

304. The M2M platform returns the equivalent semantic descriptor to the second application entity.

In the foregoing technical solution, the M2M platform provides an application entity with a function of converting a resource semantic descriptor, and the application entity may query the platform for an equivalent semantic descriptor that is in the second ontology and that is of semantics in the first ontology such that the application entity understands resources that reference different ontologies.

Figure 11:
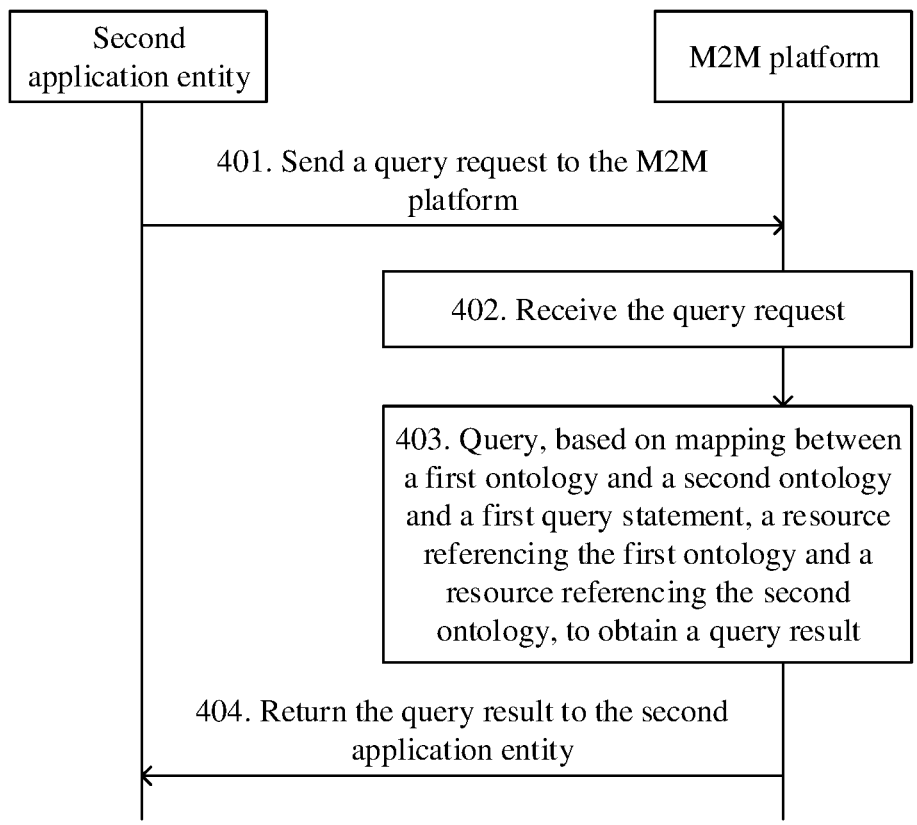
FIG. 11 is another schematic flowchart of an ontology management method according to an embodiment of this application.

Optionally, referring to FIG. 11, an ontology management method according to an embodiment of this application further includes the following steps.

Step 401. A second application entity sends a query request to the M2M platform, where the query request carries the identifier of the ontology mapping resource and a first query statement that is based on the first ontology. In the first query statement, a word in the first ontology may be used as a keyword. For example, the first query statement is "query a resource whose attribute "author" is Jim Hendler", where "author" is a word in the first ontology. The second application entity may be the foregoing first application entity, or may be another application entity other than the first application entity. When the second application entity is different from the first application entity, a manner of obtaining the identifier of the ontology mapping resource by the second application entity is already described in step 301, and details are not described again.

Step 402. The M2M platform receives the query request, obtains the identifier of the ontology mapping resource from the query request, locates the ontology mapping resource based on the identifier of the ontology mapping resource, and obtains the mapping between the first ontology and the second ontology from the ontology mapping resource.

Step 403. The M2M platform queries, based on the mapping between the first ontology and the second ontology and the first query statement, a resource referencing the first ontology and a resource referencing the second ontology, to obtain a query result.

Step 403 may be implemented in the following two manners.

Manner a. The M2M platform determines, based on the mapping between the first ontology and the second ontology, a second query statement that is equivalent to the first query statement and that is based on the second ontology, the M2M platform queries, based on the first query statement, the resource referencing the first ontology, to obtain a first query result, and queries, based on the second query statement, the resource referencing the second ontology, to obtain a second query result.

The keyword in the first query statement is a word in the first ontology, and the second ontology may not include the keyword, or the keyword is another meaning in the second ontology. Therefore, when the first query statement is used to directly query the resource referencing the second ontology, it is probably that no resources can be found, or an incorrect resource is found. In the manner a, the M2M platform determines the query statement that is equivalent to the first query statement and that is based on the second ontology, that is, the second query statement, and uses the second query statement to query the resource referencing the second ontology, to find a resource that satisfies a query condition. For example, when the first query statement is "query a resource whose attribute "author" is Jim Hendler", the M2M platform determines, based on the mapping between the first ontology and the second ontology, that an equivalent word of "author" in the second ontology is "writer". Therefore, it may be determined that the second query statement equivalent to the first query statement is "query a resource whose attribute "writer" is Jim Hendler".

Manner b. First, the M2M platform determines, based on the mapping between the first ontology and the second ontology, an equivalent semantic descriptor that is of the resource referencing the second ontology and that is based on the first ontology. For example, a second resource is a book and references the second ontology. The second resource includes an attribute "writer", and a value of the attribute "writer" is Jim Hendler, which is used to describe that a writer of the book is Jim Hendler. When the second resource is semantically described based on the first ontology, the M2M platform determines that an equivalent attribute, of the attribute "writer", in the first ontology is "author". Therefore, the semantic descriptor that is of the second resource and that is based on the first ontology includes "author: Jim Hendler".

It should be noted that the resource referencing the second ontology may have a plurality of attributes and/or subresources. When the equivalent semantic descriptor that is of the resource and that is based on the first ontology is determined, the foregoing semantic descriptor conversion may be performed on each attribute and/or subresource of the resource. Optionally, the M2M platform determines an attribute and/or a subresource that are/is related to the first query statement and that are/is in attributes or subresources of the resource referencing the second ontology, and performs semantic descriptor conversion only on these related attributes and/or subresources of the resource. For example, the second resource further includes an attribute "digital object unique identifier (DOI)", which is a book identifier, and an attribute that corresponds to the attribute "DOI" and that is in the first ontology is "international standard book number (ISBN)". Because the first query statement is related only to the attribute "author" of the second resource and is irrelevant to the attribute "ISBN" of the second resource, the M2M platform may perform semantic descriptor conversion only on the attribute "author" of the second resource.

After determining the equivalent semantic descriptor that is of the resource referencing the second ontology and that is based on the first ontology, the M2M platform may query, based on the first query statement, the resource referencing the first ontology, to obtain a first query result, and queries, based on the first query statement and the equivalent semantic descriptor, the resource referencing the second ontology, to obtain a second query result. For example, the M2M platform determines that the equivalent semantic descriptor that is of the foregoing second resource and that is based on the first ontology includes "author: Jim Hendler". Therefore, when the resource referencing the second ontology is queried using the first query statement "query a resource whose attribute "author" is Jim Hendler", it may be determined that the second resource is a resource that satisfies a query condition.

Step 404. The M2M platform returns the query result to the second application entity.

According to the foregoing technical solution, an application entity may perform, using a query statement based on one ontology, a query operation on resources that reference different ontologies rather than performing query using different query statements such that the query operation is simplified and query efficiency is improved.

The following describes the platform described in FIG. 11 using the mapping between the "product" ontology and the "volume" ontology shown in FIG. 5 as an example.

A semantic descriptor that is stored in the "product" ontology in FIG. 5 and that is about a book whose writer is Jim Hendler is as follows.

Title: Social Machines: The coming collision of Artificial Intelligence, Social Networking, and Humanity; Doi: 9781484211571; Author: Jim Hendler.

A semantic descriptor that is stored in the "volume" ontology and that is about a book whose writer is Jim Hendler and is as follows.

Isdn: 978-0123735560; Writer: Jim Hendler; Title: Semantic Web for the Working Ontologist: Effective modeling in RDFS and OWL.

According to the method shown in FIG. 11, an application entity may query for a book whose writer is Jim Hendler in a resource referencing the "product" ontology and a resource referencing the "volume" ontology, and a query statement may be as follows.

```
SELECT    ?author ?title
WHERE
          {FILTER regex1(? author, "Jim Hendler")
          ?x bookstore:title ?title
}
```

A query result includes the following two records.
Title:
Machines: The coming collision of Artificial Intelligence, Social Networking, and
Humanity;
Semantic Web for the Working Ontologist: Effective modeling in RDFS and OWL.

Figure 12:
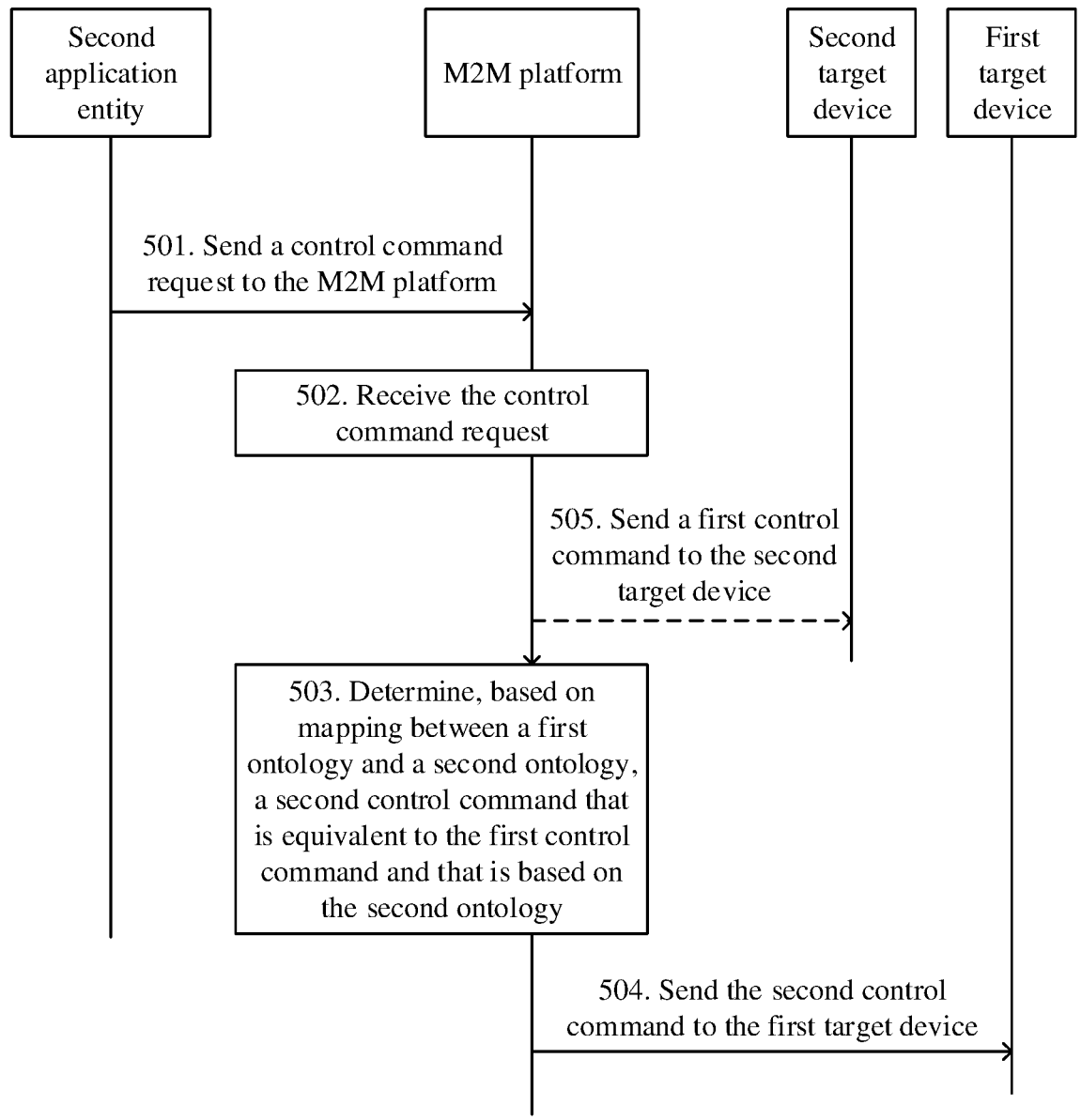
FIG. 12 is another schematic flowchart of an ontology management method according to an embodiment of this application.

Optionally, referring to FIG. 12, an ontology management method according to an embodiment of this application further includes the following steps.

Step 501. A second application entity sends a control command request to the M2M platform, where the control command request carries an identifier of a target device that references the second ontology and a first control command that is based on the first ontology. For example, the first control command includes a "switch off" instruction, where "switch off" is a word in the first ontology and indicates "disable a device".

Step 502. The M2M platform receives the control command request.

Step 503. Determine, based on the mapping between the first ontology and the second ontology, a second control command that is equivalent to the first control command and that is based on the second ontology.

In a possible implementation of step 503, the control command request further carries the identifier of the ontology mapping resource, and after receiving the control command request, the M2M platform locates the ontology mapping resource based on the identifier of the ontology mapping resource, obtain the mapping between the first ontology and the second ontology from the ontology mapping resource, and then determines, based on the mapping, a control command that is equivalent to the first control command and that is based on the second ontology. For example, the second ontology does not include the word "switch off", but provides a word "turn off" to indicate "disable a device". Therefore, the M2M platform determines that the second control command is "turn off" instruction.

In another possible implementation of step 503, the control command request does not carry the identifier of the ontology mapping resource. After receiving the control command request, the M2M platform determines that the second ontology referenced by the first target device is different from the first ontology on which the first control command is based. The M2M platform invokes the ontology mapping resource, and determines, based on the mapping between the first ontology and the second ontology, the second control command equivalent to the first control command.

Step 504. The M2M platform sends the second control command to the first target device. After receiving the second control command, the first target device responds to the second control command.

In the foregoing technical solution, the application entity may control, according to the first control command that is based on the first ontology, the first target device that references the second ontology. This simplifies a process in which the application entity controls devices that reference different ontologies, and improves efficiency of the M2M communications system.

Optionally, the control command request further carries an identifier of a second target device, and the second target device references the first ontology. After step 502, the method further includes the following step.

Step 505. The M2M platform sends the first control command to the second target device.

In the foregoing solution, the application entity may send a control command (the first control command) to the M2M platform, to instruct the M2M platform to forward the control command to the first target device and the second target device. The M2M platform determines that the first ontology referenced by the second target device is the same as the ontology on which the first control command is based, and may directly send the first control command to the second target device. In addition, the M2M platform determines that the second ontology referenced by the first target device is different from the first ontology on which the first control command is based, converts, in a manner of step 503, the first control command to the second control command that can be understood by the first target device, and then sends the second control command to the first target device. Therefore, in the foregoing technical solution, devices that reference different ontologies can be controlled using one control command such that the devices that reference different ontologies can work cooperatively, thereby improving efficiency of the M2M communications system.

Figure 13:
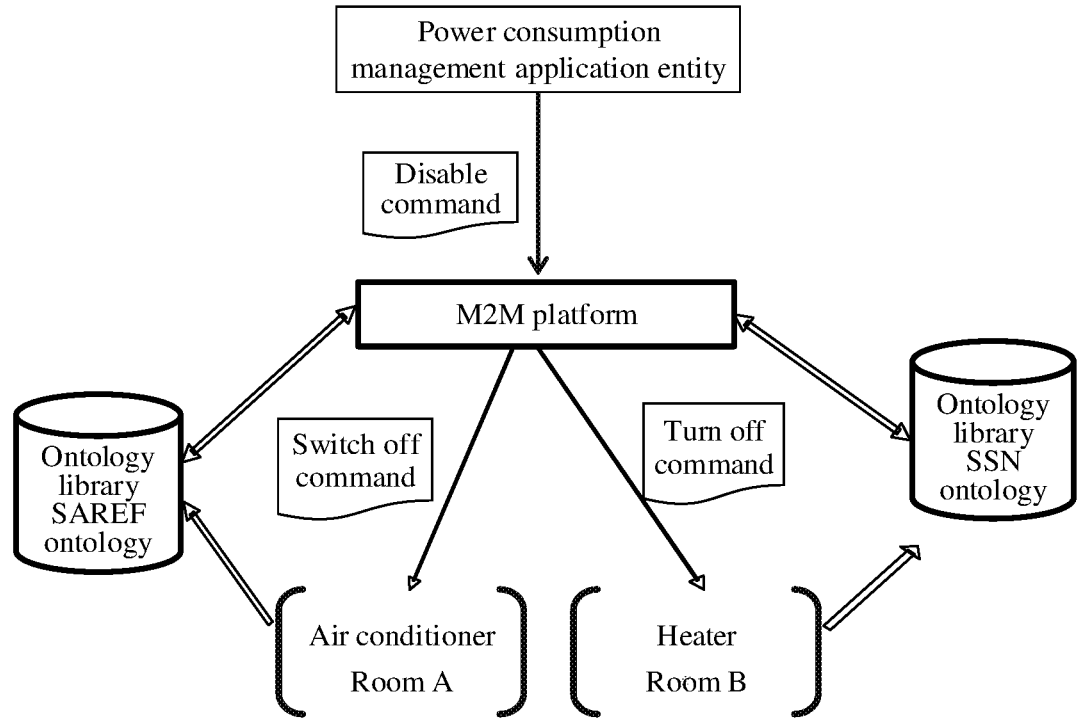
FIG. 13 is a schematic diagram of device control in the field of smart appliances.

The following describes application of the solution shown in FIG. 12 in the field of smart appliances. An instruction that corresponds to a "disable" command and that is in a smart appliances reference (SAREF) ontology is "switch off", and an instruction that corresponds to the "disable" command and that is in a semantic sensor network (SSN) ontology is "turn off". In FIG. 13, an air conditioner in a room A references a SAREF ontology, and a heater in a room B references an SSN ontology. A process of controlling the air conditioner and the heater by an application entity is as follows. A power consumption management application entity obtains an ambient temperature, determines that the air conditioner and the heater need to be turned off, and sends a "disable" command to the M2M platform. The "disable" command may be a "switch off" command based on the SAREF ontology, or may be a "turn off" command based on the SSN ontology, or may be a command based on a basic ontology, for example, a "close" command. The M2M platform determines that the "disable" command in the SAREF ontology referenced by the air conditioner is the "switch off" command, and sends the "switch off" command to the air conditioner, and determines that the "disable" command in the SSN ontology referenced by the heater is the "turn off" command, and sends the "turn off" command to the heater.

Figure 14:
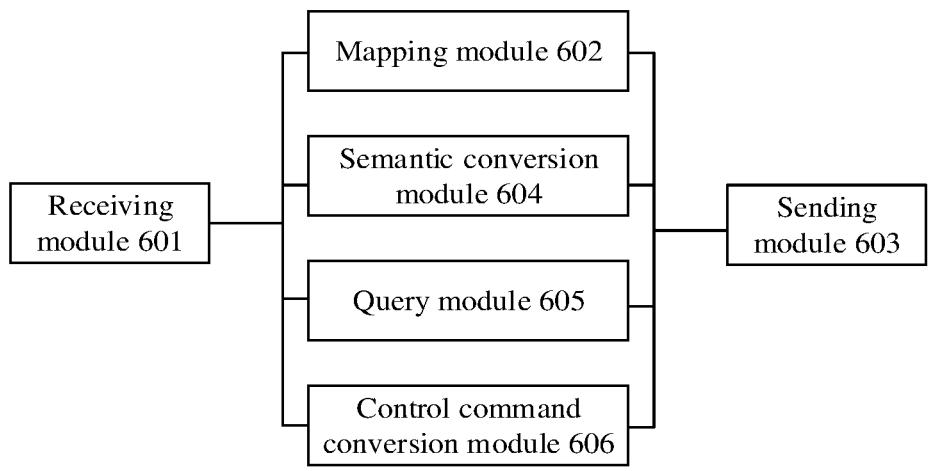
FIG. 14 is a schematic structural diagram of an M2M platform according to an embodiment of this application.

FIG. 14 is a schematic diagram of an M2M platform according to an embodiment of this application. The M2M platform includes a receiving module 601 configured to receive an ontology mapping request sent by a first application entity, where the ontology mapping request carries a first ontology identifier, a second ontology identifier, and mapping method description information, a mapping module 602 configured to determine a first ontology and a second ontology based on the first ontology identifier and the second ontology identifier, determine a mapping manner based on the mapping method description information, and create mapping between the first ontology and the second ontology according to the determined mapping manner, and store the mapping between the first ontology and the second ontology in an ontology mapping resource, and a sending module 603 configured to return an identifier of the ontology mapping resource to the first application entity.

Optionally, the receiving module 601 is further configured to receive a semantic conversion request sent by a second application entity, where the semantic conversion request carries an identifier of a first resource and the identifier of the ontology mapping resource, the first resource references the first ontology, and the second application entity and the first application entity are a same application entity or different application entities.

The platform further includes a semantic conversion module 604 configured to locate the ontology mapping resource based on the identifier of the ontology mapping resource, and obtain the mapping between the first ontology and the second ontology from the ontology mapping resource, obtain the first resource based on the identifier of the first resource, and determine, based on the mapping between the first ontology and the second ontology, an equivalent semantic descriptor that is of the first resource and that is based on the second ontology.

The sending module 603 is further configured to return the equivalent semantic descriptor to the second application entity.

Optionally, the receiving module 601 is further configured to receive a query request sent by a second application entity, where the query request carries the identifier of the ontology mapping resource and a first query statement that is based on the first ontology, and the second application entity and the first application entity are a same application entity or different application entities.

The platform further includes a query module 605 configured to locate the ontology mapping resource based on the identifier of the ontology mapping resource, and obtain the mapping between the first ontology and the second ontology from the ontology mapping resource, and query, based on the mapping between the first ontology and the second ontology and the first query statement, a resource referencing the first ontology and a resource referencing the second ontology, to obtain a query result.

The sending module 603 is further configured to return the query result to the second application entity.

Optionally, the query module 605 is configured to determine, based on the mapping between the first ontology and the second ontology, a second query statement that is equivalent to the first query statement and that is based on the second ontology, query, based on the first query statement, the resource referencing the first ontology, to obtain a first query result, and query, based on the second query statement, the resource referencing the second ontology, to obtain a second query result, where the query result includes the first query result and the second query result.

Optionally, the query module 605 is configured to determine, based on the mapping between the first ontology and the second ontology, an equivalent semantic descriptor that is of the resource referencing the second ontology and that is based on the first ontology, query, based on the first query statement, the resource referencing the first ontology, to obtain a first query result, and query, based on the first query statement and the equivalent semantic descriptor, the resource referencing the second ontology, to obtain a second query result, where the query result includes the first query result and the second query result.

Optionally, the receiving module 601 is further configured to receive a control command request sent by a second application entity, where the control command request carries an identifier of a first target device and a first control command that is based on the first ontology, the first target device references the second ontology, and the second application entity and the first application entity are a same application entity or different application entities.

The platform further includes a control command conversion module 606 configured to determine, based on the mapping between the first ontology and the second ontology, a second control command that is equivalent to the first control command and that is based on the second ontology.

The sending module 603 is further configured to send the second control command to the first target device.

Optionally, the control command request further carries the identifier of the ontology mapping resource.

The control command conversion module 606 is further configured to, before the second control command that is equivalent to the first control command and that is based on the second ontology is determined based on the mapping between the first ontology and the second ontology, locate the ontology mapping resource based on the identifier of the ontology mapping resource, and obtain the mapping between the first ontology and the second ontology from the ontology mapping resource.

Optionally, the control command request further carries an identifier of a second target device, and the second target device references the first ontology.

The sending module 603 is further configured to send the first control command to the second target device.

Optionally, the mapping module 602 is configured to determine a mapping algorithm policy based on a mapping policy parameter in the mapping method description information, where the mapping algorithm policy includes any one of a single mapping algorithm policy, a multi-mapping algorithm policy, and an algorithm traversal policy, the single mapping algorithm policy is used to determine a single mapping algorithm as a mapping algorithm between the first ontology and the second ontology, the multi-mapping algorithm policy is used to determine at least two mapping algorithms as mapping algorithms between the first ontology and the second ontology, and the algorithm traversal policy is used to determine that the mapping between the first ontology and the second ontology is created by traversing all mapping algorithms.

Optionally, the mapping module 602 is configured to determine the mapping algorithm between the first ontology and the second ontology based on the determined mapping algorithm policy and at least two preset mapping algorithms, where the at least two preset mapping algorithms include at least two of a linguistic feature extraction algorithm, a structural feature extraction algorithm, an external resource obtaining algorithm, and a logical reasoning algorithm.

Optionally, the mapping module 602 is configured to determine, based on a mapping evaluation parameter in the mapping method description information, a mapping result evaluation manner, where the evaluation manner includes an interactive evaluation mode or an automatic threshold mode, the interactive evaluation mode is used to determine that the mapping result is evaluated through interaction between the M2M platform and the first application entity, and the automatic threshold mode is used to determine that the M2M platform evaluates the mapping result based on a preset threshold.

For implementations of the modules of the foregoing platform, refer to the implementations of the steps performed by the M2M platform in the methods described in FIG. 4 to FIG. 13. In addition, module division in this embodiment of this application is an example, is merely logical function division, and may be another division in an embodiment. In addition, function modules in the embodiments of this application may be integrated in one processor, or each of the modules may exist alone physically, or two or more modules are integrated in one module. The integrated module may be implemented in a form of hardware, or may be implemented in a form of a software functional module.

Figure 15:
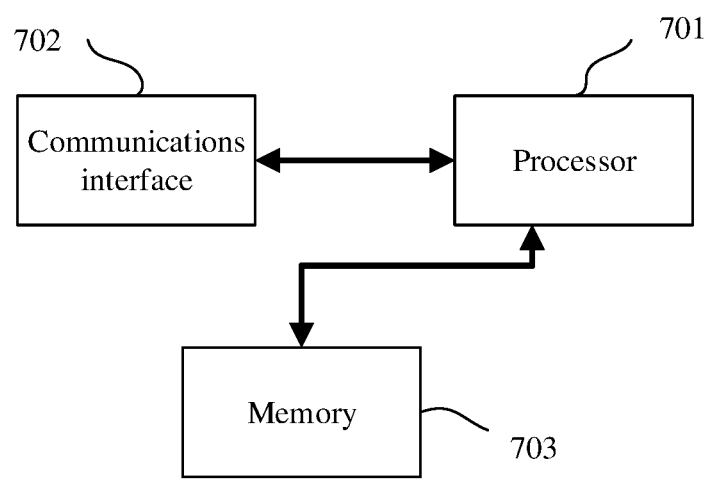
FIG. 15 is another schematic structural diagram of an M2M platform according to an embodiment of this application.

When the integrated module may be implemented in a form of hardware, as shown in FIG. 15, the M2m platform may include a processor 701. Hardware of entities corresponding to the mapping module 602, the semantic conversion module 604, the query module 605, and the control command conversion module 606 may be the processor 701. The processor 701 may be a central processing module (CPU), a digital processing module, or the like. The M2M platform may further include a communications interface 702. The processor 701 communicates with an application entity through the communications interface 702, for example, receives an ontology mapping request sent by the application entity, and sends an identifier of an ontology mapping resource to the application entity. The M2M platform further includes a memory 703 configured to store a program executed by the processor 701. The memory 703 may be a nonvolatile memory, for example, a hard disk drive (HDD) or a solid-state drive (SSD), or may be a volatile memory, for example, a random-access memory (RAM). The memory 703 is any other medium that can be configured to carry or store expected program code that has an instruction or a data structure form and that can be accessed by a computer, but is not limited thereto.

The processor 701 is configured to execute the program code stored in the memory 703, and is further configured to perform the method in any possible implementation in the technical solutions described in FIG. 4 to FIG. 13. For an implementation of the processor 701, refer to the method in the embodiments shown in FIG. 4 or FIG. 13. Details are not described herein again in this application.

This embodiment of this application does not limit a specific connection medium between the communications interface 702, the processor 701, and the memory 703. In this embodiment of this application, in FIG. 15, the memory 703, the processor 701, and the communications interface 702 are connected using a bus. The bus is represented by a thick line in FIG. 15, and a manner of connection between other components is merely an example for description, and is not construed as a limitation. The bus may be classified into an address bus, a data bus, a control bus, and the like.

An embodiment of the present disclosure further provides a computer-readable storage medium, and the computer-readable storage medium stores a computer software instruction used to execute operations that need to be executed by the foregoing processor. The computer software instruction includes a program used to execute the operations that need to be executed by the foregoing processor.

An embodiment of this application further provides a computer program product, where when the computer program product is run on a computer, the computer is enabled to perform the method in any one of the possible implementations of the ontology management methods described in FIG. 4 to FIG. 13.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc-read only memory (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, implemented by a machine-to-machine (M2M) platform, wherein the method comprises:
   receiving an ontology mapping request from a first application entity, wherein the ontology mapping request carries a first ontology identifier, a second ontology identifier, and mapping method description information, wherein the mapping method description information comprises a first mapping policy parameter;
   obtaining a first ontology and a second ontology based on the first ontology identifier and the second ontology identifier;
   obtaining a mapping manner based on the first mapping policy parameter and a second mapping policy parameter, wherein the second mapping policy parameter comprises a default parameter preset in the M2M platform;
   creating a first mapping between the first ontology and the second ontology according to the mapping manner, wherein the first mapping comprises a first indication of the first ontology, a first term describing a first resource in the first ontology, a mapping relationship description manner indicating at least one relationship, a second indication of the second ontology, and a second term describing a second resource in the second ontology, wherein the at least one relationship comprises an equivalent relationship indicating that concepts of the first ontology and the second ontology are consistent, and wherein the first term and the second term are different;
   storing the first mapping in an ontology mapping resource; and
   returning, from the M2M platform to the first application entity, an identifier of the ontology mapping resource that stores the first mapping between the first ontology and the second ontology in response to receiving the ontology mapping request from the first application entity.

2. The method of claim 1, wherein after storing the first mapping in the ontology mapping resource, the method further comprises:
   receiving a semantic conversion request from a second application entity, wherein the semantic conversion request carries an identifier of the first resource and the identifier of the ontology mapping resource, and wherein the first resource references the first ontology;
   locating the ontology mapping resource based on the identifier of the ontology mapping resource;
   obtaining the first mapping from the ontology mapping resource;
   obtaining the first resource based on the identifier of the first resource;
   obtaining, based on the first mapping, an equivalent semantic descriptor of the first resource that is based on the second ontology; and
   returning the equivalent semantic descriptor to the second application entity.

3. The method of claim 1, wherein after storing the first mapping in the ontology mapping resource, the method further comprises:
   receiving a query request from a second application entity, wherein the query request carries the identifier of the ontology mapping resource and a first query statement that is based on the first ontology;
   locating the ontology mapping resource based on the identifier of the ontology mapping resource;
   obtaining the first mapping from the ontology mapping resource;
   querying, based on a second mapping between the first ontology, the second ontology, and the first query statement, the first resource of the first ontology and the second resource of the second ontology to obtain a query result; and
   returning the query result to the second application entity.

4. The method of claim 3, wherein querying, based on the second mapping, the first resource referencing the first ontology and the second resource referencing the second ontology to obtain the query result comprises:
   obtaining, based on the first mapping, a second query statement equivalent to the first query statement and based on the second ontology;
   querying, based on the first query statement, the first resource referencing the first ontology to obtain a first query result; and
   querying, based on the second query statement, the second resource referencing the second ontology to obtain a second query result, wherein the query result comprises the first query result and the second query result.

5. The method of claim 3, wherein querying, based on the second mapping, the first resource referencing the first ontology and the second resource referencing the second ontology to obtain the query result comprises:
   obtaining, based on the first mapping, an equivalent semantic descriptor of the second resource referencing the second ontology and based on the first ontology;
   querying, based on the first query statement, the first resource referencing the first ontology to obtain a first query result; and
   querying, based on the first query statement and the equivalent semantic descriptor, the second resource referencing the second ontology to obtain a second query result, wherein the query result comprises the first query result and the second query result.

6. The method of claim 1, wherein after storing the first mapping in the ontology mapping resource, the method further comprises:
   receiving a control command request from a second application entity, wherein the control command request carries an identifier of a first target device and a first control command that is based on the first ontology, and wherein the first target device references the second ontology;
   obtaining, based on the first mapping, a second control command that is equivalent to the first control command and that is based on the second ontology; and sending the second control command to the first target device.

7. The method of claim 6, wherein the control command request further carries the identifier of the ontology mapping resource, and wherein before obtaining, based on the first mapping, the second control command that is equivalent to the first control command and that is based on the second ontology, the method further comprises:
locating the ontology mapping resource based on the identifier of the ontology mapping resource; and
obtaining the first mapping from the ontology mapping resource.

8. The method of claim 6, wherein the control command request further carries an identifier of a second target device, wherein the second target device references the first ontology, and wherein after receiving the control command request from the second application entity, the method further comprises sending the first control command to the second target device.

9. The method of claim 1, further comprising obtaining a mapping algorithm policy based on the first mapping policy parameter and the second mapping policy parameter, wherein the mapping algorithm policy comprises any one of a single mapping algorithm policy, a multi-mapping algorithm policy, or an algorithm traversal policy, wherein the single mapping algorithm policy determines a single mapping algorithm as an algorithm of the first mapping, wherein the multi-mapping algorithm policy determines at least two mapping algorithms, wherein the at least two mapping algorithms are of the first mapping, and wherein the algorithm traversal policy determines that the first mapping is created by traversing all mapping algorithms.

10. The method of claim 9, wherein after obtaining the mapping algorithm policy based on the first mapping policy parameter and the second mapping policy parameter, the method further comprises obtaining the mapping manner based on the mapping algorithm policy and at least two of a linguistic feature extraction algorithm, a structural feature extraction algorithm, an external resource obtaining algorithm, and a logical reasoning algorithm.

11. The method of claim 1, wherein obtaining the mapping manner based on the first mapping policy parameter and the second mapping policy parameter comprises obtaining, based on a mapping evaluation parameter in the mapping method description information, a mapping result evaluation manner, wherein the mapping result evaluation manner comprises an interactive evaluation mode or an automatic threshold mode, wherein the interactive evaluation mode determines that a mapping result is evaluated through interaction between the M2M platform and the first application entity, and wherein the automatic threshold mode determines that the M2M platform evaluates the mapping result based on a preset threshold.

12. A machine-to-machine (M2M) platform, comprising:
one or more processors; and
a memory coupled to the one or more processors and configured to store instructions that, when executed by the one or more processors, processor, cause the M2M platform to be configured to:
receive an ontology mapping request from a first application entity, wherein the ontology mapping request carries a first ontology identifier, a second ontology identifier, and mapping method description information, wherein the mapping method description information comprises a first mapping policy parameter;
obtain a first ontology and a second ontology based on the first ontology identifier and the second ontology identifier;
obtain a mapping manner based on the first mapping policy parameter and a second mapping policy parameter, wherein the second mapping policy parameter comprises a default parameter preset in the M2M platform;
create a first mapping between the first ontology and the second ontology according to the mapping manner, wherein the first mapping comprises a first indication of the first ontology, a first term describing a first resource in the first ontology, a mapping relationship description manner indicating at least one relationship, a second indication of the second ontology, and a second term describing a second resource in the second ontology, wherein the at least one relationship comprises an equivalent relationship indicating that concepts of the first ontology and the second ontology are consistent, and wherein the first term and the second term are different;
store the first mapping in an ontology mapping resource; and
return, from the M2M platform to the first application entity, an identifier of the ontology mapping resource that stores the first mapping between the first ontology and the second ontology in response to receiving the ontology mapping request from the first application entity.

13. The M2M platform of claim 12, wherein the instructions further cause the M2M platform to be configured to:
receive a semantic conversion request from a second application entity, wherein the semantic conversion request carries an identifier of the first resource and the identifier of the ontology mapping resource, wherein the first resource references the first ontology, and wherein the second application entity and the first application entity are a same application entity or different application entities;
locate the ontology mapping resource based on the identifier of the ontology mapping resource;
obtain the first mapping from the ontology mapping resource;
obtain the first resource based on the identifier of the first resource;
obtain, based on the first mapping, an equivalent semantic descriptor that is of the first resource and that is based on the second ontology; and
return the equivalent semantic descriptor to the second application entity.

14. The M2M platform of claim 12, wherein the instructions further cause the M2M platform to be configured to:
receive a query request from a second application entity, wherein the query request carries the identifier of the ontology mapping resource and a first query statement that is based on the first ontology, and wherein the second application entity and the first application entity are a same application entity or different application entities;
locate the ontology mapping resource based on the identifier of the ontology mapping resource;
obtain the first mapping from the ontology mapping resource;
query, based on a second mapping between the first ontology and the second ontology and the first query statement, the first resource referencing the first ontology and the second resource referencing the second ontology to obtain a query result; and return the query result to the second application entity.

15. The M2M platform of claim 14, wherein instructions further cause the M2M platform to be configured to:
obtain, based on the first mapping between the first ontology and the second ontology, a second query statement that is equivalent to the first query statement and that is based on the second ontology;
query, based on the first query statement, the first resource referencing the first ontology to obtain a first query result; and
query, based on the second query statement, the second resource referencing the second ontology to obtain a second query result, wherein the query result comprises the first query result and the second query result.

16. The M2M platform of claim 14, wherein the instructions further cause the M2M platform to be configured to:
obtain, based on the first mapping between the first ontology and the second ontology, an equivalent semantic descriptor that is of the second resource referencing the second ontology and that is based on the first ontology;
query, based on the first query statement, the first resource referencing the first ontology to obtain a first query result; and
query, based on the first query statement and the equivalent semantic descriptor, the second resource referencing the second ontology to obtain a second query result, wherein the query result comprises the first query result and the second query result.

17. The M2M platform of claim 12, wherein the instructions further cause the M2M platform to be configured to:
receive a control command request from a second application entity, wherein the control command request carries an identifier of a first target device and a first control command that is based on the first ontology, wherein the first target device references the second ontology, and wherein the second application entity and the first application entity are a same application entity or different application entities;
obtain, based on the first mapping between the first ontology and the second ontology, a second control command that is equivalent to the first control command and that is based on the second ontology; and
send the second control command to the first target device.

18. The M2M platform of claim 12, wherein the first mapping policy parameter and the second mapping policy parameter instruct the M2M platform to use at least two mapping algorithms to create the first mapping between the first ontology and the second ontology.

19. The M2M platform of claim 12, wherein the mapping method description information further comprises a threshold from the first application entity, and wherein the instructions further cause the M2M platform to be configured to evaluate the first mapping based on the threshold.

20. A computer program product comprising instructions stored on a non-transitory computer-readable medium that, when executed by one or more processors, cause a machine-to-machine (M2) platform to:
receive an ontology mapping request from a first application entity, wherein the ontology mapping request carries a first ontology identifier, a second ontology identifier, and mapping method description information, wherein the mapping method description information comprises a first mapping policy parameter;
obtain a first ontology and a second ontology based on the first ontology identifier and the second ontology identifier;
obtain a mapping manner based on the first mapping policy parameter and a second mapping policy parameter, wherein the second mapping policy parameter comprises a default parameter preset in the M2M platform;
create a first mapping between the first ontology and the second ontology according to the mapping manner, wherein the first mapping comprises a first indication of the first ontology, a first term describing a first resource in the first ontology, a mapping relationship description manner indicating at least one relationship, a second indication of the second ontology, and a second term describing a second resource in the second ontology, wherein the at least one relationship comprises an equivalent relationship indicating that concepts of the first ontology and the second ontology are consistent, and wherein the first term and the second term are different;
store the first mapping in an ontology mapping resource; and
return, from the M2M platform to the first application entity, an identifier of the ontology mapping resource that stores the first mapping between the first ontology and the second ontology in response to receiving the ontology mapping request from the first application entity.

* * * * *